(12) United States Patent
Honsberg et al.

(10) Patent No.: US 8,125,803 B2
(45) Date of Patent: Feb. 28, 2012

(54) SIGNAL CONVERTER FOR GENERATING SWITCH DRIVE SIGNALS FOR A MULTI-LEVEL CONVERTER, DRIVE CIRCUIT, PULSE-WIDTH-MODULATION SIGNAL GENERATOR, MULTI-LEVEL CONVERTER, METHODS AND COMPUTER PROGRAM

(75) Inventors: Marco Honsberg, Duesseldorf (DE); Thomas Radke, Langenfeld (DE)

(73) Assignee: Mitsubishi Electric Europe B.V. Niederlassung Deutschland, Ratingen (DE)

( * ) Notice: Subject to any disclaimer, the term of this patent is extended or adjusted under 35 U.S.C. 154(b) by 443 days.

(21) Appl. No.: 12/514,486

(22) PCT Filed: Dec. 12, 2007

(86) PCT No.: PCT/EP2007/010899
§ 371 (c)(1),
(2), (4) Date: Jun. 11, 2009

(87) PCT Pub. No.: WO2009/074172
PCT Pub. Date: Jun. 18, 2009

(65) Prior Publication Data
US 2011/0058399 A1    Mar. 10, 2011

(51) Int. Cl.
*H02M 1/12* (2006.01)
*H02M 1/14* (2006.01)
(52) U.S. Cl. ............................................ 363/41; 363/43

(58) Field of Classification Search .................... 363/97, 363/98, 124, 131, 132, 41, 43; 332/109, 332/110
See application file for complete search history.

(56) References Cited

U.S. PATENT DOCUMENTS

| 7,622,873 | B2 * | 11/2009 | Takata et al. | 318/362 |
| 7,733,679 | B2 * | 6/2010 | Luger et al. | 363/98 |
| 2003/0048650 | A1 | 3/2003 | Asaeda et al. | |

FOREIGN PATENT DOCUMENTS

| EP | 0 555 557 A1 | 8/1993 |
| JP | 2001-136750 A | 5/2001 |

OTHER PUBLICATIONS

Official Communication issued in International Patent Application No. PCT/EP2007/010899, mailed on Oct. 28, 2008.

* cited by examiner

*Primary Examiner* — Harry Behm
*Assistant Examiner* — Matthew Grubb
(74) *Attorney, Agent, or Firm* — Keating & Bennett, LLP

(57) ABSTRACT

A signal converter for generating switch drive signals for a multi-level converter includes a logic. In the presence of the first polarity, the logic sets the first switch drive signal and the third switch drive signal according to the pulse width modulation input signals, and sets the second switch drive signal to a signal level indicating a closed state of the second switch and the fourth switch drive signal to a given signal level indicating an opened state of the fourth switch. In the presence of the second polarity, the logic sets the second switch drive signal and the fourth switch drive signal according to the pulse-width-modulation input signals, sets the first switch drive signal to a signal level indicating an opened state of the first switch, and sets the third switch drive signal to a signal level indicating a closed state of the third switch.

14 Claims, 20 Drawing Sheets

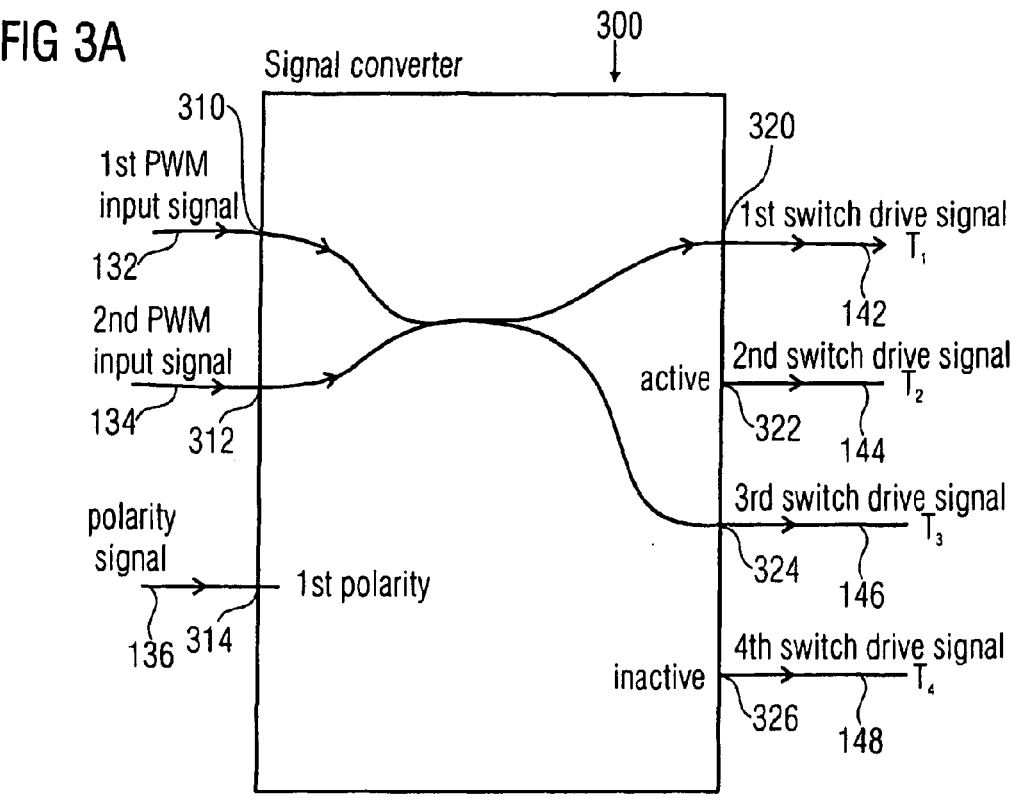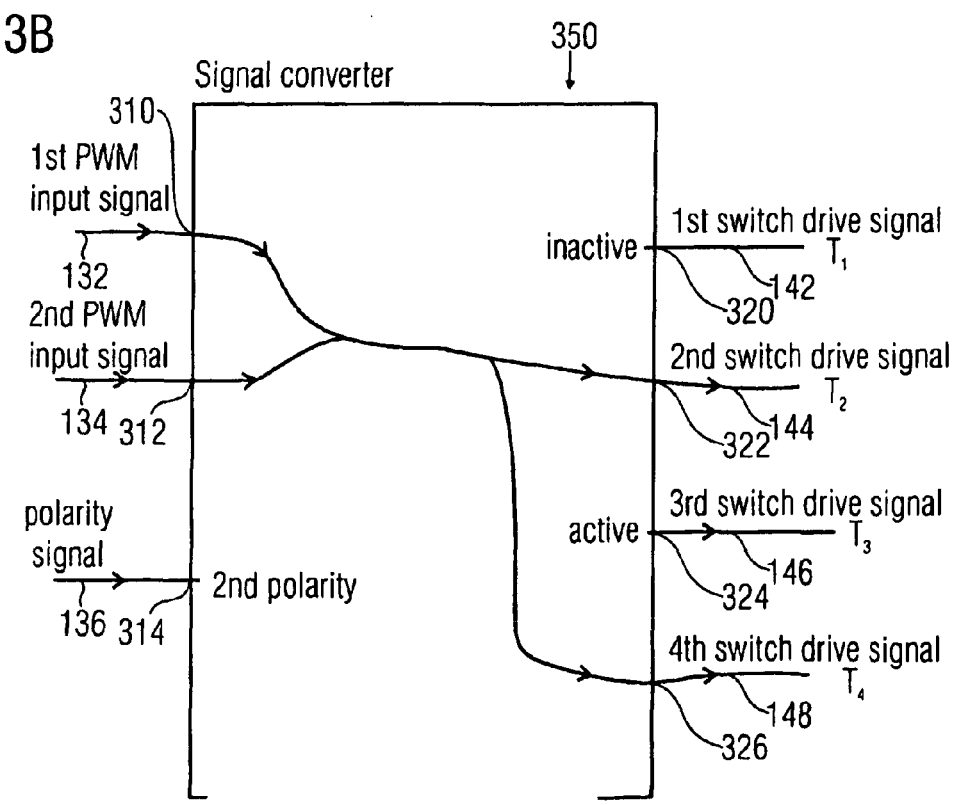

Figure 5A:
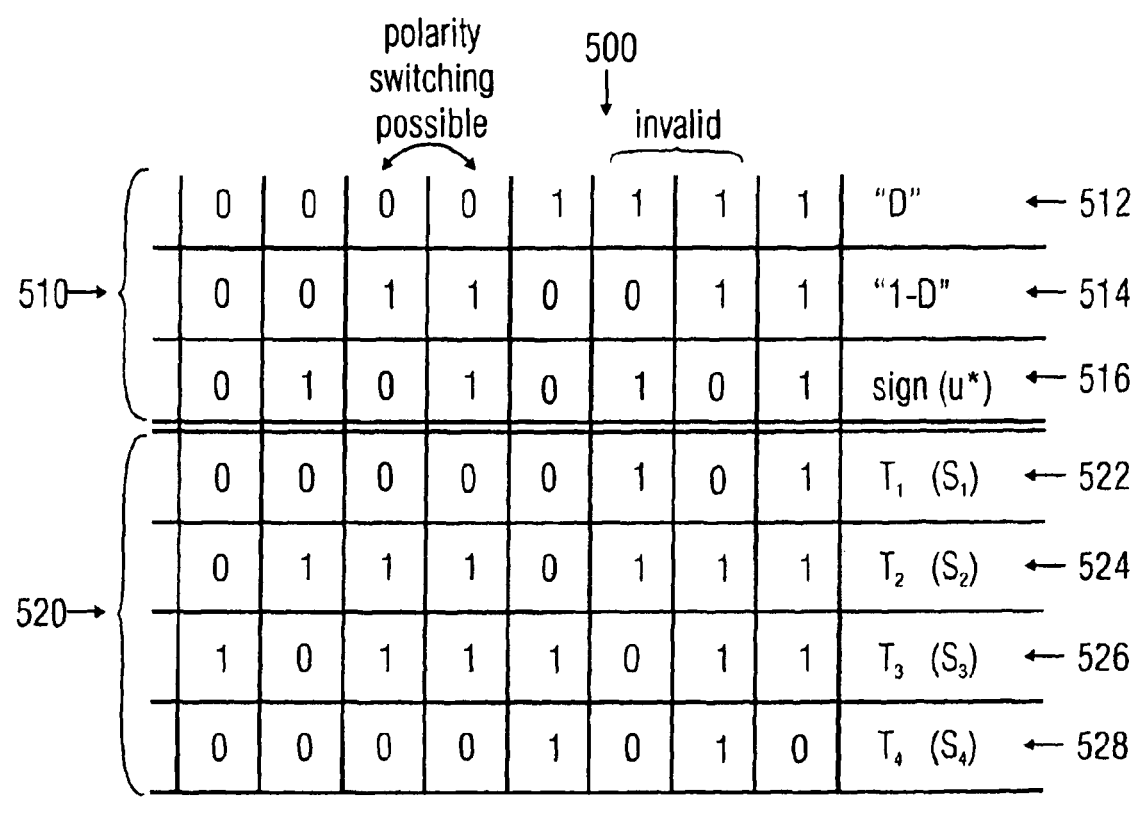

|   |   |   |   |   |   |   |   |          |
|---|---|---|---|---|---|---|---|----------|
| 0 | 0 | 0 | 0 | 1 | 1 | 1 | 1 | "D"      | ← 512
| 0 | 0 | 1 | 1 | 0 | 0 | 1 | 1 | "1-D"    | ← 514
| 0 | 1 | 0 | 1 | 0 | 1 | 0 | 1 | sign (u*) | ← 516
| 0 | 0 | 0 | 0 | 0 | 1 | 0 | 1 | $T_1 (S_1)$ | ← 522
| 0 | 1 | 1 | 1 | 0 | 1 | 1 | 1 | $T_2 (S_2)$ | ← 524
| 1 | 0 | 1 | 1 | 1 | 0 | 1 | 1 | $T_3 (S_3)$ | ← 526
| 0 | 0 | 0 | 0 | 1 | 0 | 1 | 0 | $T_4 (S_4)$ | ← 528

510 → {512, 514, 516}
520 → {522, 524, 526, 528} polarity switching possible ↔
500 → invalid

| sig(U*) | sig(I) | T1 | T2 |
|---------|--------|----|-----|
| + | + | D | 1-D |
| + | − | D | 1-D |
| − | + | D | 1-D |
| − | − | D | 1-D |

| sig(U*) | sig(I) | T1 | T2 | T3 | T4 | |
|---------|--------|----|----|----|----|---|
| + | + | D | 1 | (1-D) | 0 | 1042 |
| + | − | (D) | 1 | 1-D | 0 | 1044 |
| − | + | 0 | (1-D) | 1 | (D) | 1046 |
| − | − | 0 | 1-D | 1 | D | 1048 |

| sig(U*) | sig(I) | T1 | T2 | T3 | T4 | |
|---|---|---|---|---|---|---|
| + | + | D | 1 | (1-D) | 0 | —1042 |
| + | − | (D) | 1 | 1-D | 0 | —1044 |
| − | + | 0 | D | 1 | 1-D | —1046 |
| − | − | 0 | D | 1 | 1-D | —1048 |

FIG 10C

SIGNAL CONVERTER FOR GENERATING SWITCH DRIVE SIGNALS FOR A MULTI-LEVEL CONVERTER, DRIVE CIRCUIT, PULSE-WIDTH-MODULATION SIGNAL GENERATOR, MULTI-LEVEL CONVERTER, METHODS AND COMPUTER PROGRAM

BACKGROUND OF THE INVENTION

Embodiments according to the invention are related to a signal converter for generating switch drive signals for a multi-level converter, a drive circuit for generating switch drive signals for a multi-level converter, a pulse-width-modulation signal generator for generating two pulse-width-modulation signals and a polarity signal and to a multi-level converter. Some further embodiments according to the invention are related to a method for driving at least four switches in a switch circuit of a multi-level converter and to a method for generating two pulse-width-modulation signals and a polarity signal. Some other embodiments according to the invention are related to computer programs. Some embodiments according to the invention are related to a 3-level hybrid drive system.

In many technical applications, it is desirable to convert supply voltages between different voltage levels and/or frequencies. For example, in some applications it is desirable to generate a supply voltage of a predetermined amplitude and/or predetermined waveform from one or more supply potentials. One possibility for generating a desired voltage or current signal on the basis of three different potentials is to use a 3-level pulse-width-modulation (PWM). 3-level pulse-width-modulation is for example used for railway driving apparatuses and for medium high voltage converters.

Since approximately one year, the 3-level circuit concept is increasingly getting relevant for uninterruptable power supplies (also designated as "UPS" or "USV"), for example in a power range of about 7.5 kVA, i.e. for the mass market. The 3-level solution, which is more complex with respect to the circuitry when compared to the previous standard topology of this application, the 2-level converter, has decisive advantages with respect to the overall efficiency and—except for the increased drive effort of a conventional 3-level solution—with respect to the total costs of such a uninterruptable power supply system.

In the following, some characteristics of conventional systems for generating a three-phase signal will be discussed. However, there are naturally also some one-phase systems or two-phase systems.

While 2-level topologies (for example for generating a 3-phase signal) get by with 6 generated switch signals, some 3-level topologies (e.g. for a 3-phase signal) need twelve drive signals for the power elements. Accordingly, it is more complicated and complex to generate these control signals (or drive signals, or switch signals).

In 3-level medium high voltage converters and railway converters, professional digital signal processors ("DSP") or "field programmable gate arrays" ("FPGA") are used in order to generate the twelve control signals (or drive signals). In contrast, for 2-level topologies, there are some very inexpensive standard microprocessors (or microcontrollers) available, even in the low cost domain, comprising the pulse-width-modulation unit with dead time generation for six switch elements already integrated.

In view of the above discussion, there is a need for a cost-efficient concept for generating the drive signals for a multi-level converter.

This need is satisfied by some embodiments according to the invention.

SUMMARY

According to an embodiment, a pulse width modulation signal generator for generating two pulse-width-modulation signals and a polarity signal on the basis of a control quantity may have: a polarity signal generator configured to generate the polarity signal with a first signal level indicating a first polarity, if the control quantity is larger than a predetermined threshold value, and to generate the polarity signal with a second signal level indicating a second polarity, if the control quantity is smaller than the predetermined threshold value; and a pulse width modulator configured to generate the first pulse-width-modulation signal such that a duty cycle of the first pulse-width-modulation signal increases substantially monotonically with an absolute value of a difference between the control quantity and the threshold value, and configured to generate the second pulse-width-modulation signal such that the second pulse-width-modulation signal is complementary with respect to the first pulse-width-modulation signal, except for a dead time, during which both the first pulse-width-modulation signal and the second pulse-width-modulation signal are inactive, wherein the pulse-width-modulation signal generator is configured to ensure, that the polarity signal remains unchanged as long as the first pulse-width-modulation signal is active.

According to another embodiment, a driver circuit for generating switch drive signals for a multi-level converter may have: a pulse width modulation signal generator for generating two pulse-width-modulation signals and a polarity signal on the basis of a control quantity having: a polarity signal generator configured to generate the polarity signal with a first signal level indicating a first polarity, if the control quantity is larger than a predetermined threshold value, and to generate the polarity signal with a second signal level indicating a second polarity, if the control quantity is smaller than the predetermined threshold value; and a pulse width modulator configured to generate the first pulse-width-modulation signal such that a duty cycle of the first pulse-width-modulation signal increases substantially monotonically with an absolute value of a difference between the control quantity and the threshold value, and configured to generate the second pulse-width-modulation signal such that the second pulse-width-modulation signal is complementary with respect to the first pulse-width-modulation signal, except for a dead time, during which both the first pulse-width-modulation signal and the second pulse-width-modulation signal are inactive, wherein the pulse-width-modulation signal generator is configured to ensure, that the polarity signal remains unchanged as long as the first pulse-width-modulation signal is active; and a signal converter configured to generate, on the basis of the first pulse-width-modulation signal, the second pulse-width-modulation signal and the polarity signal, at least four switch drive signals for driving at least four switches of the multi-level converter.

According to another embodiment, a multi-level converter for generating an output signal on the basis of at least three different input potentials may have: a driver circuit for generating switch drive signals for a multi-level converter having: a pulse width modulation signal generator for generating two pulse-width-modulation signals and a polarity signal on the basis of a control quantity having: a polarity signal generator configured to generate the polarity signal with a first signal level indicating a first polarity, if the control quantity is larger than a predetermined threshold value, and to generate the polarity signal with a second signal level indicating a second polarity, if the control quantity is smaller than the predetermined threshold value; and a pulse width modulator configured to generate the first pulse-width-modulation signal such that a duty cycle of the first pulse-width-modulation signal increases substantially monotonically with an absolute value of a difference between the control quantity and the threshold value, and configured to generate the second pulse-width-modulation signal such that the second pulse-width-modulation signal is complementary with respect to the first pulse-width-modulation signal, except for a dead time, during which both the first pulse-width-modulation signal and the second pulse-width-modulation signal are inactive, wherein the pulse-width-modulation signal generator is configured to ensure, that the polarity signal remains unchanged as long as the first pulse-width-modulation signal is active; and a signal converter configured to generate, on the basis of the first pulse-width-modulation signal, the second pulse-width-modulation signal and the polarity signal, at least four switch drive signals for driving at least four switches of the multi-level converter; and a switch circuit having three potential feeds and at least four switches; wherein a first switch and a second switch are circuited in series between a first potential feed and an output node, at which the output signal is present, wherein a third switch and a fourth switch are circuited in series between the output node and a second potential feed, wherein a node, via which the first switch is coupled with the second switch, is coupled with a third potential feed via a first unidirectional conducting device, and wherein a node, via which the third switch is coupled with the fourth switch, is coupled with the third potential feed via a second unidirectional conducting device.

Some embodiments according to the invention create a signal converter for generating switch drive signals for a multi-level converter. The signal converter comprises an input for a first pulse-width-modulation input signal and for a second pulse-width-modulation input signal. The converter also comprises an input for a polarity signal indicating a first polarity or a second polarity. The signal converter comprises a first output for a first switch drive signal, for driving a first switch of a multi-level converter. The signal converter comprises a second output for a second switch drive signal for driving a second switch of the multi-level converter, a third output for a third switch drive signal for driving a third switch of the multi-level converter and a fourth output for a fourth switch drive signal for driving a fourth switch of the multi-level converter.

The signal converter comprises a logic circuit configured to drive the switch drive signals in dependence on the polarity signal. The logic circuit is configured to perform the following functionality in the presence of the first polarity in an active state of operation, in which one and only one out of the first pulse-width-modulation input signal and the second pulse-width-modulation input signal is active: set the first switch drive signal according to one out of the pulse-width-modulation input signals (for example according to the first PWM signal); set the third switch drive signal according to another of the pulse-width-modulation input signals (for example according to the second PWM signal); set the second switch drive signal to a given signal level indicating a closed state of the second switch; and setting the fourth switch drive signal to a given signal level indicating an open state of the fourth switch.

The logic circuit is configured to perform the following functionality in the presence of the second polarity in the active state of operation: set the second switch drive signal according to one out of the pulse-width-modulation input signals (for example according to the second PWM signal); set the fourth switch drive signal according to another out of the pulse-width-modulation input signals (for example according to the first PWM signal); set the first switch drive signal to a given signal level indicating an opened state of the first switch; and setting the third switch drive signal to a given signal level indicating a closed state of the third switch.

Some embodiments according to the invention are based on the finding that a 2-line pulse-width-modulation output signal of a pulse-width-modulation signal generator (for example a signal adapted to drive switches of a 2-level converter) can be used to generate, by means of a logic circuit, at least four switch drive signals for a multi-level converter by making use of a polarity signal. Thus, a simple 2-line pulse-width-modulation signal generator can actually be applied, with an inexpensive modification for providing the polarity signal, in order to generate switch drive signals for a multi-level converter, for example for a 3-level converter.

Consequently, the signal converter according to some embodiments of the invention allows the generation of four switch drive signals for a multi-level converter on the basis of input signals (the first pulse-width-modulation input signal, the second pulse-width-modulation input signal and the polarity signal), which can be generated in a very cost-efficient way by introducing only easy-to-implement modifications into existing pulse-width-modulation signal generators.

To summarize, signal converters according to some embodiments of the invention can be considered as very helpful elements for implementing a multi-level converter in a cost-efficient way.

Some embodiments according to the invention create a drive circuit for generating switch drive signals for a multi-level converter, for example for a 3-level converter.

According to some embodiments, such a drive circuit may comprise a pulse-width-modulation signal generator and a signal converter.

According to some embodiments, the pulse-width-modulation signal generator is configured to generate a first pulse-width-modulation signal with an adjustable duty cycle and to generate a second pulse-width-modulation signal with an adjustable duty cycle, such that the first pulse-width-modulation signal and the second pulse-width-modulation signal are complementary to each other, except for a dead time during which both the first pulse-width-modulation signal and the second pulse-width-modulation signal are inactive. The pulse-width-modulation signal generator may be configured to provide a polarity signal indicating whether the multi-level converter is to generate an output signal above a threshold value or below the threshold value.

The signal converter may be configured to generate, on the basis of the first pulse-width-modulation signal and the second pulse-width-modulation signal and the polarity signal, at least four switch drive signals for driving at least four switches of the multi-level converter.

Some embodiments according to the invention are based on the finding that two substantially complementary pulse-width-modulation signals and a polarity signal may be used as an efficient intermediate quantity for generating four switch drive signals for a multi-level converter. The two substantially (apart from a dead time) complementary pulse-width-modulation signals and the polarity signals can be generated with little effort in a pulse-width-modulation signal generator.

Also, it has been found that said three signals may be a sufficient basis for generating four switch drive signals making use of a signal converter, which may for example be implemented as a very simple logic circuit. In other words, the characteristics of the two substantially complementary pulse-width-modulation signals and the polarity signal are ideally suited for the purpose of operating a multi-level converter, as said signals can be easily generated and still comprise the appropriate characteristics for deriving therefrom with little effort the switch drive signals. In other words, it has been found that two pulse-width-modulation signals, which may for example be used for driving 2-level converters, can be easily translated into signals for driving a converter having more than 2-levels, for example for driving a 3-level converter.

Some embodiments according to the invention create a converter for generating an output signal on the basis of at least three different potentials. The converter comprises a signal converter and a switch circuit. The signal converter may for example be configured to generate at least four switch drive signals for directly or indirectly driving at least four switches of the switch circuit. The signal converter may be configured to generate said switch drive signals on the basis of a first pulse-width-modulation signal, a second pulse-width-modulation signal and a polarity signal indicating a first polarity or a second polarity.

The switch circuit may comprise three potential feeds and at least four switches, which may for example all have reverse conducting capability, for example by an anti-parallel diode. A first switch and a second switch may be circuited in series between a first potential feed and an output node, at which the output signal is present. A third switch and a fourth switch may be circuited in series between the output node and a second potential feed. A node, via which the first switch is coupled with the second switch, may be coupled with a third potential feed via a unidirectional conducting element (for example a first diode). A node, via which the third switch is coupled with the fourth switch, may be coupled with the third potential feed via a unidirectional conducting element (for example a second diode).

Said converter for generating an output signal on the basis of at least three input potentials is based on the finding that very easy-to-generate input signals, namely the first pulse-width-modulation signal, the second pulse-width-modulation signal and the polarity signal, may be used in order to generate the drive signals for the switches.

Some embodiments according to the invention create a pulse-width-modulation signal generator for generating two pulse-width-modulation signals and a polarity signal on the basis of a control quantity. The pulse-width-modulation signal generator may for example comprise a polarity signal generator, which may be configured to generate the polarity signal with a first signal level indicating a first polarity, if the control quantity is larger than a given threshold value. The polarity signal generator may be configured to generate the polarity signal with a second signal level indicating a second polarity, if the control quantity is smaller than the given threshold value. The pulse-width-modulation signal generator may comprise a pulse width modulator configured to generate a first pulse-width-modulation signal such that a duty cycle of the first pulse-width-modulation signal is increasing substantially monotonically with an absolute value of a difference between the control quantity and the threshold value. Also, the pulse width modulator may be configured to generate a second pulse-width-modulation signal such that the second pulse-width-modulation signal is substantially complementary to the first pulse-width-modulation signal, except for a dead time during which both the first pulse-width-modulation signal and the second pulse-width-modulation signal are inactive.

Some embodiments according to the invention are based on the finding that the three signals generated by the above-described pulse-width-modulation signal generator are particularly well suited for operating a multi-level converter, for example a 3-level converter. The signals generated by the above-described pulse-width-modulation signal generator can for example be processed by a signal converter in an efficient way in order to obtain therefrom at least four switch drive signals for a multi-level converter, at very low effort.

Also, the above-defined pulse-width-modulation signal generator can be implemented itself with little effort, wherein a substantial portion of the functionality can be realized by standard circuits which are available at low costs. In addition, it has been found that encoding an absolute value of the difference between the control quantity and the threshold value by the duty cycle of the first pulse-width-modulation signal constitutes a particularly efficient-to-use intermediate quantity for a multi-level converter. Encoding a relationship between the control quantity and the threshold value as a separate polarity signal has been found to be helpful in some embodiments according to the invention in order to generate the four switch drive signals with little effort.

To summarize, the above-described pulse-width-modulation signal generator is very well suited to cooperate with the signal converter mentioned herein and the multi-level converter mentioned herein.

It should be noted here that several embodiments according to the invention share the common concept to make use of the first pulse-width-modulation signal, the second pulse-width-modulation signal and the polarity signal as an intermediate quantity for controlling the operation of a multi level converter.

Some embodiments according to the invention create a method for driving at least four switches of a switch circuit in a multi-level converter and a method for generating two pulse-width-modulation signals and a polarity signal on the basis of a control quantity. Some embodiments of said methods are based on the considerations mentioned above.

Some embodiments according to the invention create a computer program for performing the methods.

BRIEF DESCRIPTION OF THE DRAWINGS

Embodiments of the present invention will be detailed subsequently referring to the appended drawings, in which:

FIG. 2b is a graphical representation of a first pulse-width-modulation signal "D" and a second pulse-width-modulation signal "1-D", which may be generated by the pulse-width-modulation signal generator according to FIG. 2a;

FIG. 3a is a block schematic diagram of the operation of a signal converter for a first polarity of the polarity signal, according to an embodiment of the invention;

FIG. 3b is a block schematic diagram of the operation of a signal converter for a second polarity of the polarity signal, according to an embodiment of the invention;

FIG. 5a is a logic table of the signal converter shown in FIG. 4, according to an embodiment of the invention;

FIG. 10a is a signal allocation table for driving a switch circuit of a 2-level converter using two substantially complementary pulse-width-modulation signals;

FIG. 10b is a signal allocation table for driving a switch circuit of a 3-level converter using two substantially complementary pulse-width-modulation signals, according to an embodiment of the invention;

FIG. 10c is a signal allocation table for driving a switch circuit of a 3-level converter using two substantially complementary pulse-width-modulation signals, according to another embodiment of the invention;

DETAILED DESCRIPTION OF THE INVENTION

In the following, the structure of a multi-level converter according to an embodiment of the invention will be described in order to allow for an understanding of the invention disclosed herein. Nevertheless, it should be noted that embodiments according to the invention are not limited to a multi-level converter in its entirety. Rather, some embodiments according to the invention merely comprise one or some of the components, which may be used in a multi-level converter.

Figure 1:
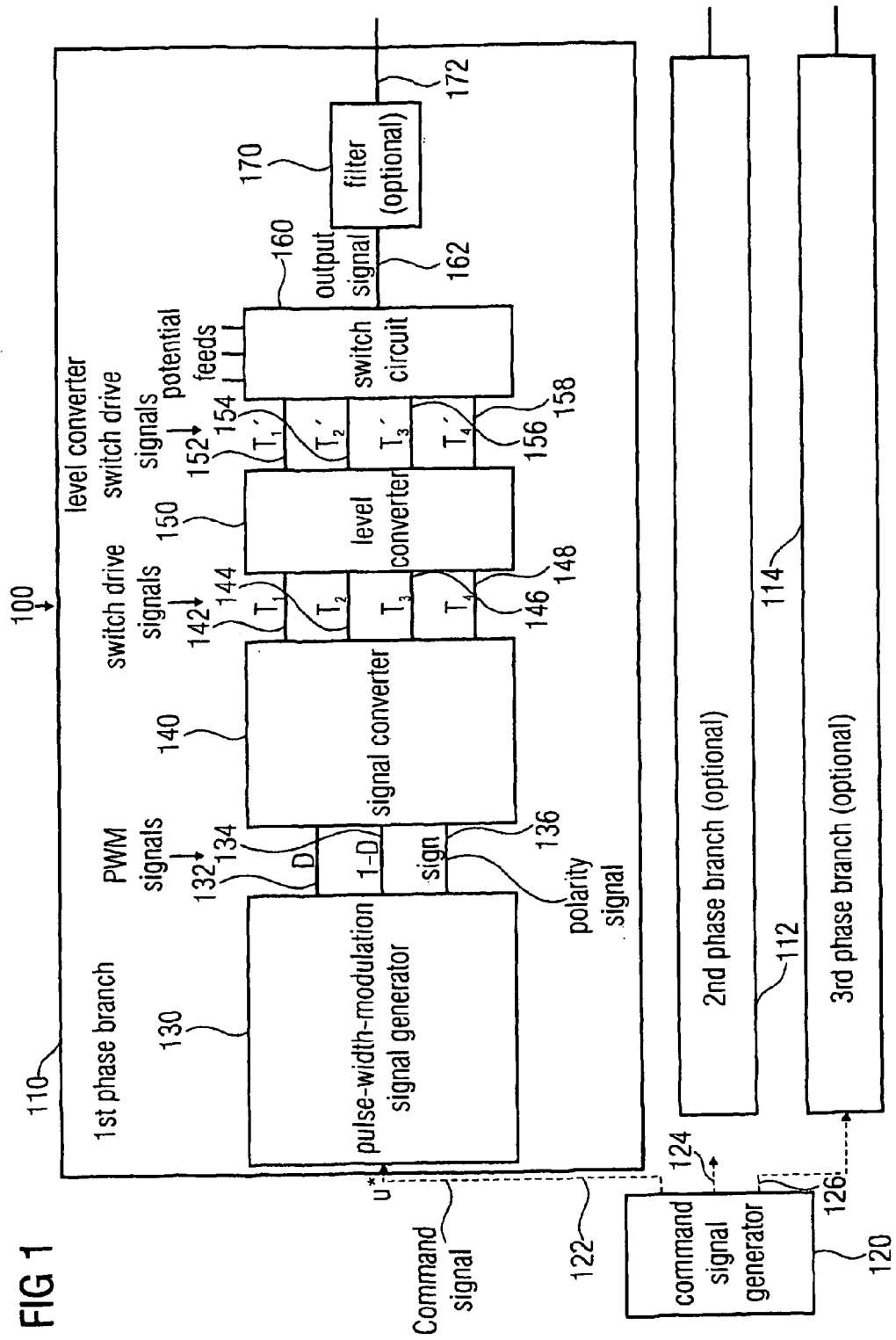
FIG. 1 is a block schematic diagram of a multi-level converter, according to an embodiment of the invention.

FIG. 1 shows a block schematic diagram of a multi-level converter, according to an embodiment of the invention. The multi-level converter of FIG. 1 is designated in its entirety with 100. The multi-level converter 100 comprises at least one phase branch 110. However, if the multi-level converter 10 is for example a multi-phase multi-level converter, the multi-level converter 100 may comprise more than one phase branch. In other words, the multi-level converter 100 may for example comprise an optional second phase branch 112 and an optional third phase branch 114.

The multi-level converter 100 may for example comprise a command signal generator 120 configured to provide command signals or command values 122, 124, 126 to the one or more phase branches 110, 112, 114. The one or more command signals 122, 124, 126 may for example describe a desired 1-phase or multi-phase output signal to be generated at the one or more outputs of the multi-level converter. For example, the first command signal 122 may describe a sinusoidal-shaped waveform by a sequence of analog or digital sample values. In the following, the command signal 122 will be designated with u*.

In the following, the first phase branch 110 will be described in more detail. However, it should be noted that if the multi-level converter 100 comprises more than one phase branch, the other optional phase branches 112, 114 may for example be very similar to the first phase branch 110.

The first phase branch 110 comprises a pulse-width-modulation signal generator 130 (also designated as PWM signal generator for the sake of brevity). The PWM signal generator 130 is configured to receive the command signal 122 from the command signal generator 120 and to provide two pulse-width-modulation signals (PWM signals) 132, 134. The first PWM signal 132 is also designated with "D" in the following, and the second PWM signal 134 is also designated with "1-D" in the following. The PWM signal generator is configured to provide a polarity signal 136, which will also be designated with "sign" or with "sign(u*)" in the following.

The first phase branch 110 comprises a signal converter 140, which is configured to receive the first PWM signal 132 ("D"), the second PWM signal 134 ("1-D") and the polarity signal 136 ("sign") from the pulse-width-modulation signal generator 130. The signal converter 140 is configured to provide four switch drive signals 142 ("$T_1$"), 144 ("$T_2$"), 146 ("$T_3$"), 148 ("$T_4$") for driving four switches. The signal converter 140 is configured to provide the switch drive signals 142 to 148 on the basis of the two pulse-width-modulation signals 132, 134 and on the basis of the polarity signal 136.

The first phase branch 110 further comprises an optional level converter 150, which may be configured to receive the switch drive signals 142 to 148 from the signal converter 140 and to provide four level-converted switch drive signals 152 ("$T_1'$"), 154 ("$T_2'$"), 156 ("$T_3'$"), 158 ("$T_4'$").

The first phase branch comprises a switch circuit 160, which is configured to be fed with three different potentials via three potential feeds. Moreover, the switch circuit 160 is configured to receive the level-converted switch drive signals 152 to 158 from the level converter 150. Alternatively, for example in the absence of the level converter 150, the switch circuit 160 may also be coupled to the signal converter 140 to receive the switch drive signals 142 to 148 provided by the signal converter 140.

The switch circuit 160 is configured to couple an output node with at least one (in some embodiments with one and only one) of the potential feeds via respective switches in dependence on the switch drive signals or level-converted switch drive signals. The switch circuit 160 is thus configured to provide an output signal on the basis of the potentials provided by the potential feeds in dependence on the switch drive signals or level-converted switch drive signals input to the switch circuit 160.

The output signal 162 provided by the switch circuit 160 may optionally be fed to an optional filter 170. The filter 170 may for example comprise a low-pass filter circuit configured to low-pass filter the output signal 162 to provide a low-pass filtered output signal 172. However, in some embodiments, the output signal 162 of the switch circuit 160 may form the output signal of the first phase branch 110.

In the following, the overall functionality of the multi-level signal converter 100 will be briefly explained on the basis of the above structural description.

The command signal generator 120 generates the command signal, which describes a desired waveform (or at least a desired average waveform) of the output signal 162 or of the output signal 172. The pulse-width-modulation signal generator 130 generates the two PWM signals 132, 134 on the basis of the command signal 122, such that the PWM signals 132, 134 are representative of a desired value of the output signal 162 or of a desired short term average value of the output signal 162. The polarity signal 136 may for example describe, whether the output signal 162 should be smaller than or larger than a middle potential of the three potentials provided to the switch circuit 160. In some embodiments, in which the switch circuit 160 is fed with three potentials, one of which is set to a value above a middle potential, and one of which is set to a value below the middle potential, the polarity signal 136 may for example describe the polarity of the output signal with respect to the middle potential.

The signal converter 140 generates the switch drive signals 142 to 148 on the basis of the signals provided by the pulse-width-modulation signal generator. The signals provided by the pulse-width-modulation signal generator 130 are particularly easy-to-generate signals, which can be converted into the switch drive signals 142 to 148 with typically very small effort. The switch drive signals 142 to 148 provided by the signal converter are used, either directly or making use of the level converter 150, to control the switch circuit 160. In some embodiments, the switch drive signals 142 to 148 determine, which of the switches of the switch circuit 160 are opened or closed. For example, an active state of the switch drive signals 142 to 148 may indicate a closed switch, and an inactive state of the switch drive signals 142 to 148 may indicate an opened switch.

For example, in some embodiments one switch may be associated with each of the switch drive signals 142 to 148, as will be discussed in detail in the following. Thus, the switch drive signals 142 to 148 may determine, to which of the potential feeds the output node of the switch circuit 160 is coupled. For example, a simultaneous activation of the first switch drive signal 142 and of the second switch drive signal 144 may result in coupling the output node of the switch circuit 160 to a first of the potential feeds. In contrast, a simultaneous activation of the third switch drive signal 146 and of the fourth switch drive signal 148 may result in coupling the output node of the switch circuit 166 to a second of the potential feeds. Moreover, an activation of the second switch drive signal 144 may for example result in a unidirectional coupling of the output node of the switch circuit 160 to the third potential feed, i.e. in a coupling between the third potential feed and the output node, which is only effective for a first current direction. An activation of the third switch drive signal 146 may for example result in another unidirectional coupling between the output node of the switch circuit 160 and the third potential feed, i.e. in a coupling which is only effective for a second current direction (wherein the second current direction may be opposite to the first current direction). Thus, in a state in which the first switch drive signal 142 and the second switch drive signal 144 are active, a potential, which is close to the potential of the first potential feed may be generated at the output node of the switch circuit 160. In a state in which the third switch drive signal 146 and the fourth switch drive signal 148 are active, a potential may be generated at the output node of the switch circuit 160 which is close to the potential of the second potential feed. Moreover, in a state in which the second switch drive signal 144 and the third switch drive signal 146 are active, the output node of the switch circuit 160 may be coupled to the third potential feed for a bidirectional current flow.

Thus, there may for example be three active states, in which the output node of the switch circuit 160 can be coupled to the three different potential feeds via closed switches. Naturally, there may be additional states. For example, there may be an inactive state, in which only one of the at least four switches of the switch circuit 160 is closed. Also, there may optionally be a state in which neither the switches of the switch circuit 160 is closed, such that the output node of the switch circuit 160 may be floating.

It should be noted that it is in some embodiments undesirable to actually reach a state, in which three or more of the switches of the switch circuit 160 are closed. In some embodiments, closing three or more of the switches of the switch circuit 160 may result in a short circuit situation, in which a low resistance conductive path is established between two of the potential feeds. It is in some circumstances desirable to avoid such a state.

To summarize the above, the output node of the switch circuit 160 can be pulled to three different potentials provided to the switch circuit 160 via the potential feeds. A control, to which of the potentials the output node is coupled via a closed switch, is effected by the switch drive signals 142 to 148, which are generated on the basis of the pulse-width-modulation signals 132, 134 and the polarity signal 136. A short term average value of the potential at the output node of the switch circuit 160 is in some embodiments set to a value described by the command signal 122.

Details regarding the components of the first phase branch 110 will subsequently be described.

Figure 2A:
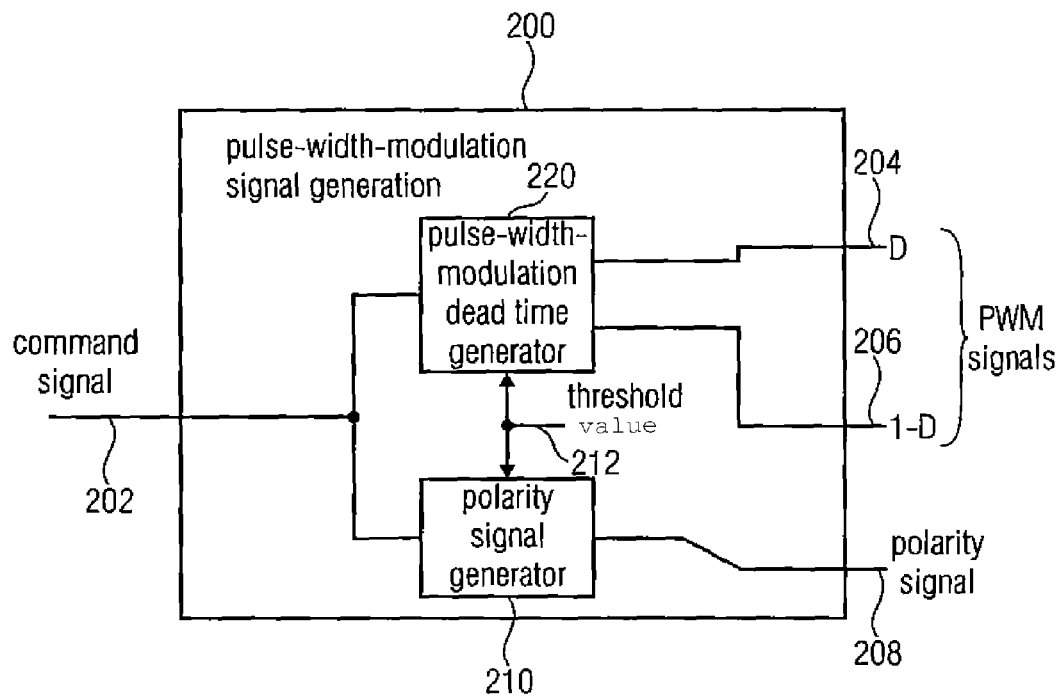
FIG. 2a is a block schematic diagram of a pulse-width-modulation signal generator, according to an embodiment of the invention.

FIG. 2a shows a block schematic diagram of PWM signal generator, according to an embodiment of the invention. The PWM signal generator shown in FIG. 2a is designated in its entirety with 200 and may for example take the place of the PWM signal generator 130. The PWM signal generator 200 is configured to receive a command signal 202, which may for example be equivalent to the command signal 122. Also, the PWM signal generator 200 may be configured to generate a first PWM signal 204 ("D") and a second PWM signal 206 ("1-D"). Moreover, the PWM signal generator 200 may be configured to generate a polarity signal 208.

The PWM signal generator 200 may comprise a polarity signal generator 210. The polarity signal generator 210 may be configured to generate the polarity signal 208 with a first signal level indicating a first polarity, if the command signal 202 (or a value indicated by the command signal 202) is larger than a given threshold value 212. The polarity signal generator 210 may further be configured to generate the polarity signal 208 with a second signal level indicating a second polarity, if the command signal (or a value described by the command signal) is smaller than the given threshold value 212.

The PWM signal generator may comprise a pulse width modulator 220, which may be configured to generate the first PWM signal 204 and the second PWM signal 206 with an adjustable duty cycle and with a dead time, as will be described in the following. The PWM modulator 220 may for example be configured to adjust the duty cycle of the PWM signals 204, 206 in dependence on the command signal 202. For example, the PWM modulator 220 may be configured such that a duty cycle of the first PWM signal 204 increases monotonically with an absolute value of a difference between the value of the command signal and the threshold value 212. The pulse-width-modulation 220 may further be configured to generate the second PWM signal 206 such that the first PWM signal 204 and the second PWM signal 206 are substantially complementary, except for dead times, during which both the first PWM signal and the second PWM signal are inactive. In other words, the pulse width modulator 220 may be configured such that a duty cycle of the second PWM signal 206 monotonically decreases with an increasing absolute value of the difference between the signal value of the command signal 202 and the threshold value 212.

In an embodiment, the pulse width modulator 220 may for example be configured such that a duty cycle of the first PWM signal 204 is equal to zero if the signal value of the command signal 202 is identical to the threshold value 212. In this case, a duty cycle of the second PWM signal 206 may for example be maximal. In contrast, a duty cycle of the first PWM signal 204 may be maximal if an absolute value of the difference between the signal value of the command signal 202 and the threshold value 212 reaches a maximum possible value. In this case, the duty cycle of the second PWM signal 206 may be minimal.

Figure 2B:
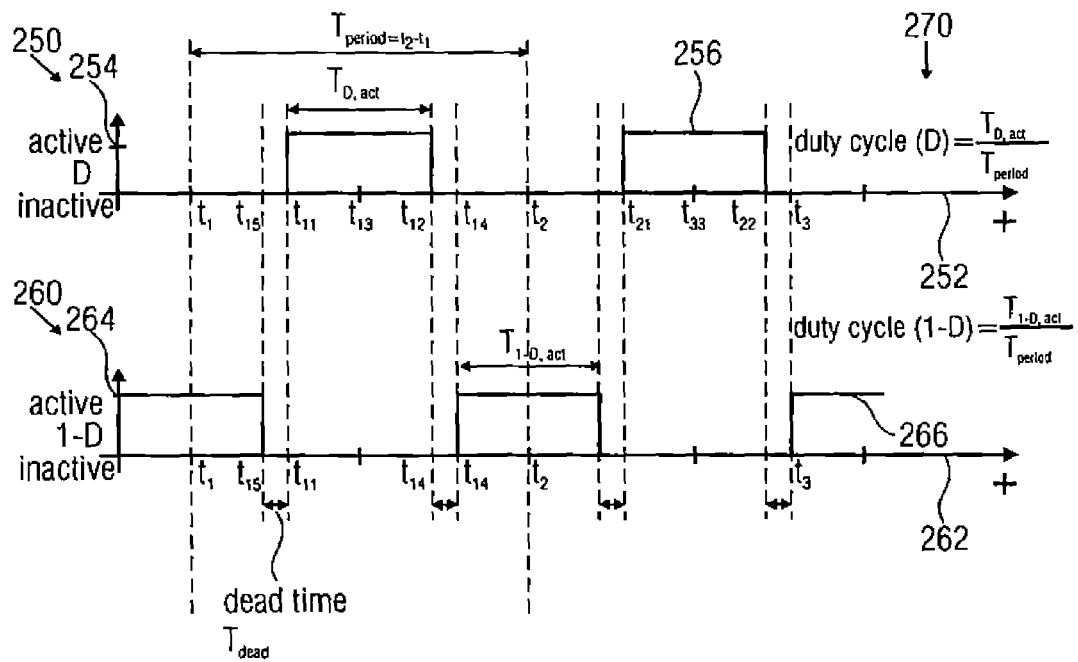

FIG. 2b shows a graphical representation of PWM signals which may be generated by the PWM signal generator 200 or by the PWM signal generator 130. A first graphical representation 250 describes, for example, the first PWM signal 204, and a second graphical representation 260 describes, for example, the second PWM signal 206. The first graphical representation 250 comprises an abscissa 252, which represents the time, and an ordinate 254, which represents the state of the first PWM signal 204. For example, the first PWM signal 204 may take an inactive state or an active state, as shown. The second graphical representation 260 comprises an abscissa 262, which represents the time, and which is aligned with the abscissa 252 of the first graphical representation 250. The second graphical representation 260 comprises an ordinate 264, which represents the state of the second PWM signal. A first curve 256 describes an exemplary temporal evolution of the first PWM signal 204, and a second curve 266 describes an exemplary temporal evolution of the second PWM signal 206. In the graphical representations 250, 260, a first PWM period is shown, which extends from a time $t_1$ to a time $t_2$. A second PWM period extends from the time $t_2$ to a time $t_3$. The first PWM signal 204 is active between times $t_{11}$ and $t_{12}$ in the first PWM period, and between times $t_{21}$ and $t_{22}$ in the second PWM period. It should be noted here that in some embodiments, the first PWM signal 204 may be active (or in an active state) around a center time $t_{13}$ of the first PWM period, and a around a center time $t_{23}$ of the second PWM period. A duty cycle of the first PWM signal 204 may for example be computed as shown in an equation 270. It should be noted here that the time period, during which the first PWM signal is active, may be differ from PWM period to PWM period, for example if the value described by the command signal changes between two PWM periods. Nevertheless, in an embodiment, the first PWM signal 204 is inactive around a beginning of a PWM period and/or around an end of the PWM period. In contrast, the first PWM signal 204 may be active in a time interval around the center of the PWM periods. The second PWM signal 206, which is represented by the curve 266 in the second graphical representation 260, is at least approximately complementary to the first PWM signal 204. However, there is a dead time between a deactivation of the first PWM signal 204 and an activation of the second PWM signal 206. For example, such a dead time can be seen between times $t_{12}$ and $t_{14}$. Similarly, there is a dead time between a deactivation of the second PWM signal 206 and an activation of the first PWM signal 204, which can for example be seen between times $t_{15}$ and $t_{11}$. In some embodiments, the dead time between the deactivation of the first PWM signal 204 and the activation of the second PWM signal 206 may be different from the dead time between the deactivation of the second PWM signal 206 and the activation of the first PWM signal 204. However, in some other embodiments, said dead times may be identical.

To summarize, it can be said that in some embodiments the first PWM signal 204 and the second PWM signal 206 are generated such that they are non-overlapping. Rather, the signals are generated such that there is a certain dead time between the deactivation of one of the signals and the activation of the other of the signals, wherein both signals are inactive during the dead time. It will become apparent to the man skilled in the art, that the presence of the dead times is useful in order to avoid the generation of a short circuit between different potentials in the switch circuit 160 of the phase branch 110.

Nevertheless, it can be noted that, with the exception of the dead times, the first PWM signal 204 and the second PWM signal 206 can be considered to be complementary. In other words, in the embodiment the first and second PWM signals 204, 206 are generated such that a duty cycle of the second PWM signal 206 decreases if the duty cycle of the first PWM signal 204 increases, and vice versa.

The duty cycle of the second PWM signal 206 can be calculated according to an equation designated with 280 in the second graphical representation 260. Due to the dead times, a sum of the duty cycles of the first PWM signal 204 and the second PWM signal 206 is slightly smaller than 1 (for 100%).

Figure 2C:
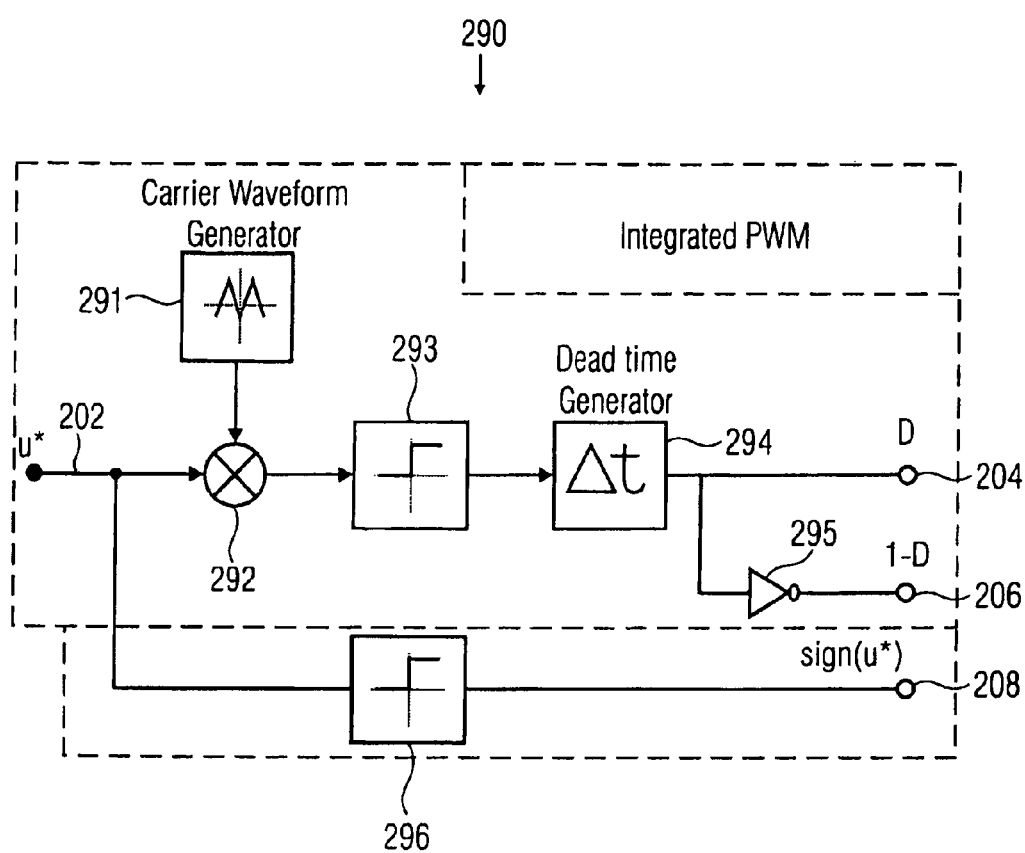
FIG. 2c is a block schematic diagram of a pulse-width-modulation signal generator, according to an embodiment of the invention.

In the following, an exemplary circuit for generating the PWM signals will be described with reference to FIG. 2c. FIG. 2c shows a block schematic diagram of a PWM signal generator, according to an embodiment of the invention. The PWM signal generator of FIG. 2c is designated in its entirety with 290. It should be noted that identical signals and means are designated with identical reference numerals within the present description.

The PWM signal generator 290 is configured to receive a command signal 202 (also designated with "u*"). The PWM signal generator 290 is configured to provide the first PWM signal 204 and the second PWM signal 206, as described above. The PWM signal generator 290 is also configured to provide a polarity signal 208 (also designated with "sign(u*)").

The PWM signal generator 290 may for example comprise a carrier waveform generator 291, which is configured to provide a carrier waveform signal to a mathematical subtraction unit 292. The carrier waveform signal may for example be a triangular signal, a saw tooth signal or another similarly shaped signal. The subtraction unit 292 is configured to receive the carrier waveform signal and to subtract the carrier waveform signal from the command signal 202 to obtain a scaled carrier waveform signal. The PWM signal generator 290 may further comprise a comparator 293 configured to receive the scaled carrier waveform signal and to compare the scaled carrier waveform signal with a given first threshold value. Accordingly, the comparator 293 may provide a comparison result signal to a dead time generator 294. The dead time generator 294 may for example be configured to provide the first PWM signal 204 and the second PWM signal 206 on the basis of the comparison result signal provided by the comparator 293. The dead time generator 294 may be configured to ensure that there is a dead time, as described with reference to FIG. 2b, between a deactivation of one of the PWM signals and a subsequent activation of the other of the PWM signals.

A generation of two substantially complementary signals, as described with reference to FIG. 2b, is symbolically represented by an inverter 295.

The PWM signal generator 290 also comprises a polarity signal generator 296. The polarity signal generator 296 may for example comprise a comparator for comparing the signal value represented by the command signal 202 with a second threshold value. The second threshold value may be identical to the first threshold value, or may be different from the first threshold value. In some embodiments, the threshold value may be set to zero, such that the output signal of the comparator 296 represents the sign of the signal value of the command signal 202.

In some embodiments, the command signal 202 may take values centered around a value of 0. In this case, a duty cycle of the first PWM signal 204 may for example represent a magnitude or an absolute value of the signal value of the command signal 202, and the polarity signal 208 may represent a sign of the value of the command signal 202. In some other embodiments, the command signal may have a different range of values. In this case, a duty cycle of the first PWM signal 204 may represent an absolute value of a difference between the value of the command signal 202 and a reference value. The polarity signal 208 may in this case for example indicate whether the value of the command signal 202 is larger or smaller than the threshold value.

In the following, the signal converter 140 will be described taking reference to FIGS. 3a, 3b, 4, 5a, 5b, 6a and 6b.

FIGS. 3a and 3b show block schematic diagrams illustrating the functionality of the signal converter 310 for two different states of the polarity signal.

The block schematic diagram of FIG. 3a is designated in its entirety with 300, and the block schematic diagram of FIG. 3b is designated in its entirety with 350. It should be noted that identical signals and means are designated with identical reference numerals in order to simplify the description.

The signal converter shown in FIGS. 3a and 3b comprises an input 310 for the first PWM input signal 132 (in brief: first PWM signal), a second input 312 for the second PWM input signal 134 and an input 314 for the polarity signal 136. The signal converter also comprises an output 320 for a first switch drive signal 142, an output 322 for the second switch drive signal 144, an output 324 for the third switch drive signal 146 and an output 326 for the fourth switch drive signal 148. It is assumed here that the signal converter 300 may comprise a logic or a logic circuit circuit, for example a static (non-clocked) logic circuit, for implementing the functionality described below. However, a clocked logic circuit may alternatively be used in some embodiments. The logic or logic circuit of the signal converter is configured to drive the switch drive signals in dependence on the polarity signal, and also in dependence on the first PWM input signal 132 received at the input 310 and the second PWM input signal 134 received at the input 312.

FIG. 3a shows a first state, in which the polarity signal 134 indicates a first polarity by taking a first state. It should be noted here that the explanations given with respect to FIGS. 3a and 3b refer to an active state of operation, in which one and only one of the PWM input signals 132, 134 is active. In an inactive state of operation, in which neither of the PWM input signals 132, 134 is active, a different state of the output signals may be present. Also, a different functionality may be present in an invalid state, in which both the first PWM input signal 132 and the second PWM input signal 134 are active, for example in order to protect the switch circuit.

However, assuming the active state of operation, the signal converter sets or drives the first switch drive signal 142 according to one out of the PWM input signals. Further, the signal converter 300 sets or drives the third switch drive signal according to the other out of the PWM input signals. For example, in the above-mentioned state, the signal converter may set the first switch drive signal 142 according to the first PWM input signal 132, and may set the third switch drive signal 146 according to the second PWM input signal 134. Alternatively, the signal converter may set the first switch drive signal 142 according to the second PWM input signal 134, and may set the third switch drive signal 146 according to the first PWM input signal 132. Moreover, in the above-mentioned state (first polarity; active state of operation) the signal converter may set the second switch drive signal 144 to an active state, indicating a closed state of the second switch, and may set the fourth switch drive signal 148 to an inactive state, indicating an open state of the fourth switch.

In the following, the functionality of the signal converter will be described in the situation that the polarity signal 136 received at the input 314 indicates a second polarity different from the first polarity. In this case, and assuming an active state (in which one and only one of the PWM input signals 132, 134 is active), the logic or logic circuit of the signal converter may drive or set the second switch drive signal 144 according to one out of the first PWM input signal 132 and the second PWM input signal 134, and the logic or logic circuit may set or drive the fourth switch drive signal 148 according to the other out of the first PWM input signal 132 and the second PWM input signal 134. For example, a the logic circuit of the signal converter may set the second switch drive signal 144 according to the second PWM input signal 134, and may set the fourth switch drive signal 138 according to the first PWM input signal 132. Alternatively, the signal converter (or the logic circuit thereof) may set the second switch drive signal 144 according to the first PWM input signal 132, and may set the fourth switch drive signal 148 according to the second PWM input signal 134.

Also, if the polarity signal 136 indicates the second polarity, and if there is an active state of operation, the signal converter 350 may set the first switch drive signal 142 to a given (e.g. inactive) signal value indicating an opened state of the first switch, and may set the third switch drive signal 146 to a given (e.g. active) signal value indicating a closed state of the third switch.

It should be noted here that in an embodiment, the signal converter sets the first switch drive signal 142 and the third switch drive signal 146 to a given (e.g. inactive) signal level, indicating an opened state of the first switch and of the third switch, if both the first PWM input signal and the PWM input signal 132, 134 are inactive, and if the polarity signal 136 indicates the first polarity. Also, in an embodiment, the signal converter sets the second switch drive signal 144 and the fourth switch drive signal 148 to a given (e.g. inactive) signal level, indicating an opened state of the second switch and of the fourth switch, if the both the first PWM input signal 132 and the second PWM input signal 134 are inactive, and if the polarity signal 136 indicates the second polarity.

Thus, it can generally be said that in some embodiments, the signal converter 300 routes one of the PWM input signals 132, 134 to the first output 320 and routes the other of the PWM input signals the third output 324, if the polarity signal 136 indicates the first polarity, and if the PWM input signals are valid (i.e. are not both active at the same time). Also, the signal converter 300 routes one out of the first PWM input signals 132, 134 to the second output 322, and routes the other of the PWM input signals to the fourth output 326, if the polarity signal 136 indicates the second polarity.

In an embodiment, the signal converter routes the first PWM input signal 132 to the first output 320 in the presence of the first polarity, and routes the first PWM input signal 132 to the fourth output 326 in the presence of the second polarity.

Figure 4:
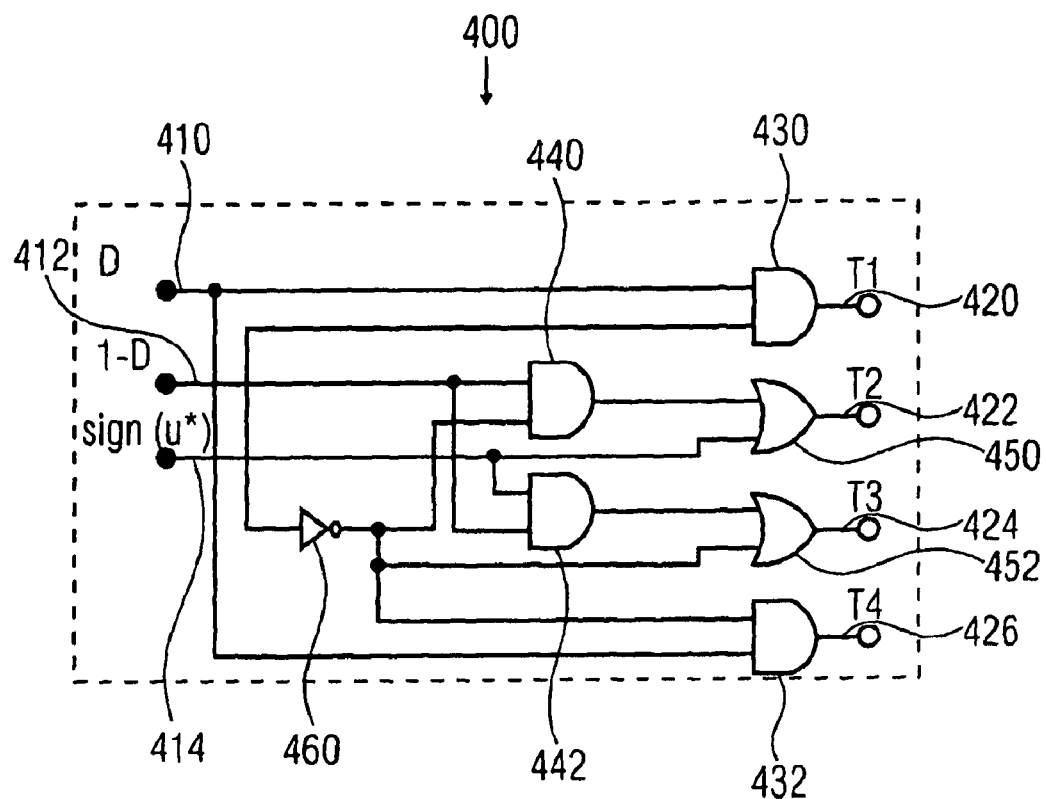
FIG. 4 is a schematic diagram of a signal converter, according to an embodiment of the invention.

In the following, a logic circuit will be described with reference to FIG. 4, which can be used to implement the signal converter 140. The circuit shown in FIG. 4 is designated in its entirety with 400. The circuit 400 comprises a first input 410 for receiving a first PWM input signal, designated with "D". The circuit 400 also comprises a second input 412 for receiving a second PWM input signal, designated with "1-D". The circuit 400 comprises a third input 414 for receiving a polarity signal, designated here with "sign(u*)". Naturally, the first input 410 may be configured to receive the first PWM signal 132, the second input 412 may be configured to receive the second PWM input signal 134 and the third input 414 may be configured to receive the polarity signal 136. The circuit 400 comprises four outputs 420, 422, 424, 426 for providing switch drive signals. For example, the first output 420 may provide the first switch drive signal 142, the second output 422 may provide the second switch drive signal 144, the third output 424 may provide the third switch drive signal 146 and the fourth output 426 may provide the fourth switch drive signal 148.

The circuit 400 comprises a first AND gate 430, a second AND gate 432, a third AND gate 440 and a fourth AND gate 442. Also, the signal converter comprises a first OR gate 450 and a second OR gate 452, as well as an inverter 460. A first input of the first AND gate 430 is connected to the first PWM signal input 410 for receiving the first PWM input signal. A second input of the first AND gate 430 is coupled to the polarity signal input 414 in order to receive the polarity signal. The first switch drive signal 142 is provided at the output of the first AND gate 430. Thus, it can be generally said that the first PWM input signal 132 is forwarded to the first output 420 via the first AND gate 430 if the polarity signal is active. If the polarity signal is inactive, the first output 420 and the first switch drive signal 142 are inactive.

A first input of the second AND gate 432 is coupled to the first PWM signal input 410 (for example directly, as shown in FIG. 4), and a second input of the second AND gate 432 is coupled to the polarity signal input 414 via the inverter 460, such that the second input of the second AND gate 432 receives the inverted polarity signal. The fourth switch drive signal 148 is provided at the output of the second AND gate 432. Thus, the first PWM input signal is forwarded (or routed) to the fourth output 426 in order to provide the fourth switch drive signal 148, if the polarity signal is inactive (i.e. if the output signal of the inverter 460 is active). In contrast, the fourth switch drive signal 148 is inactive, if the polarity signal is active.

A first input of the first OR gate 450 is coupled to the polarity signal input 414 in order to receive the polarity signal. A second input of the first OR gate is coupled to an output of the third AND gate 440. A first input of the third AND gate 440 is coupled to the second PWM signal input 412 to receive the second PWM input signal. A second input of the third AND gate 440 is coupled to the polarity signal input via the inverter 460 to receive an inverted version of the polarity signal 414. Thus, the output of the third AND gate 440 is active if the second PWM input signal 134 is active and the polarity signal 136 is inactive. The second switch drive signal 144 is provided at the output of the first OR gate 450. Thus, the second switch drive signal 144 is active if the polarity signal is active. In addition, the second switch drive signal 144 is active if the polarity signal 136 is inactive and the second PWM input signal 134 is active. Otherwise, the second switch drive signal 144 is inactive.

A first input of the second OR gate 452 is coupled to the polarity signal input 414 via the inverter 460 in order to receive an inverted version of the polarity signal 136. A second input of the second OR gate 452 is coupled to an output of the fourth AND gate 442. A first input of the fourth AND gate 442 is coupled to the polarity signal input 414 in order to receive the polarity signal 136. A second input of the fourth AND gate 442 is coupled to the second PWM signal input 412 in order to receive the second PWM signal 134. Thus, the output of the fourth AND gate 442 is active if both the polarity signal 136 and the second PWM signal 134 are active. Otherwise, the output of the fourth AND gate 442 is inactive. The third switch drive signal 146 is provided at the output of the second OR gate 452. Thus, the third switch drive signal 146 is active if the polarity signal 136 is inactive. In addition, the third switch drive signal 146 is active if the polarity signal is active and the second PWM signal is active. Otherwise, the third output 424 is inactive.

It should be noted here that an inactive state of one of the outputs 420 to 426 or switch drive signals 142 to 148 typically corresponds to an open state of the associated switch of the switch circuit 160. In contrast, an active state of one of the output signals 420 to 426 typically corresponds to a closed state of the associated switch of the switch circuit 160.

FIG. 5a shows a truth table of the signal converter 400 according to FIG. 4. The truth table of FIG. 5a is designated in its entirety with 500. An input portion 510 describes different combinations of input signals, and an output portion 520 describes the resulting output signals. A first line 512 describes a logic state of the first PWM input signal 132 "D", a second line 514 describes a logical state of the second PWM input signal 134 "1-D", and a third line 516 describes a logic state of the polarity signal 136 "sign(u*)". In the logic table, a value of "0" indicates an inactive state, and a value of 1 indicates an active state. Naturally, the logic states can be represented by respective voltages and/or currents in an actual implementation of the signal converter 400.

Apparently, as there are three input signals 132, 134, 136, there are basically eight possible combinations of these signals. However, signal combinations in which both the first PWM input signal and the second PWM input signal are active are sometimes considered as invalid or unallowable. As discussed for example with reference to FIGS. 2a and 2b, the first PWM input signal and the second PWM input signal are in many embodiments generated such that they are non-overlapping.

A first line 522 of the output portion 520 describes logic states of the first switch drive signal 142 provided at the first output 420, a second line 524 of the output portion 520 describes logic states of the second switch drive signal 144 provided at the second output 422, a third line 526 of the output portion 520 describes logic states of the third switch drive signal 146 provided at the third output 424, and a fourth line 528 of the output portion 520 describes logic states of the fourth switch drive signal 148 provided at the fourth output 426. As usual, the columns of the truth table describe an association between combinations of input signals and output signals.

Figure 5B:
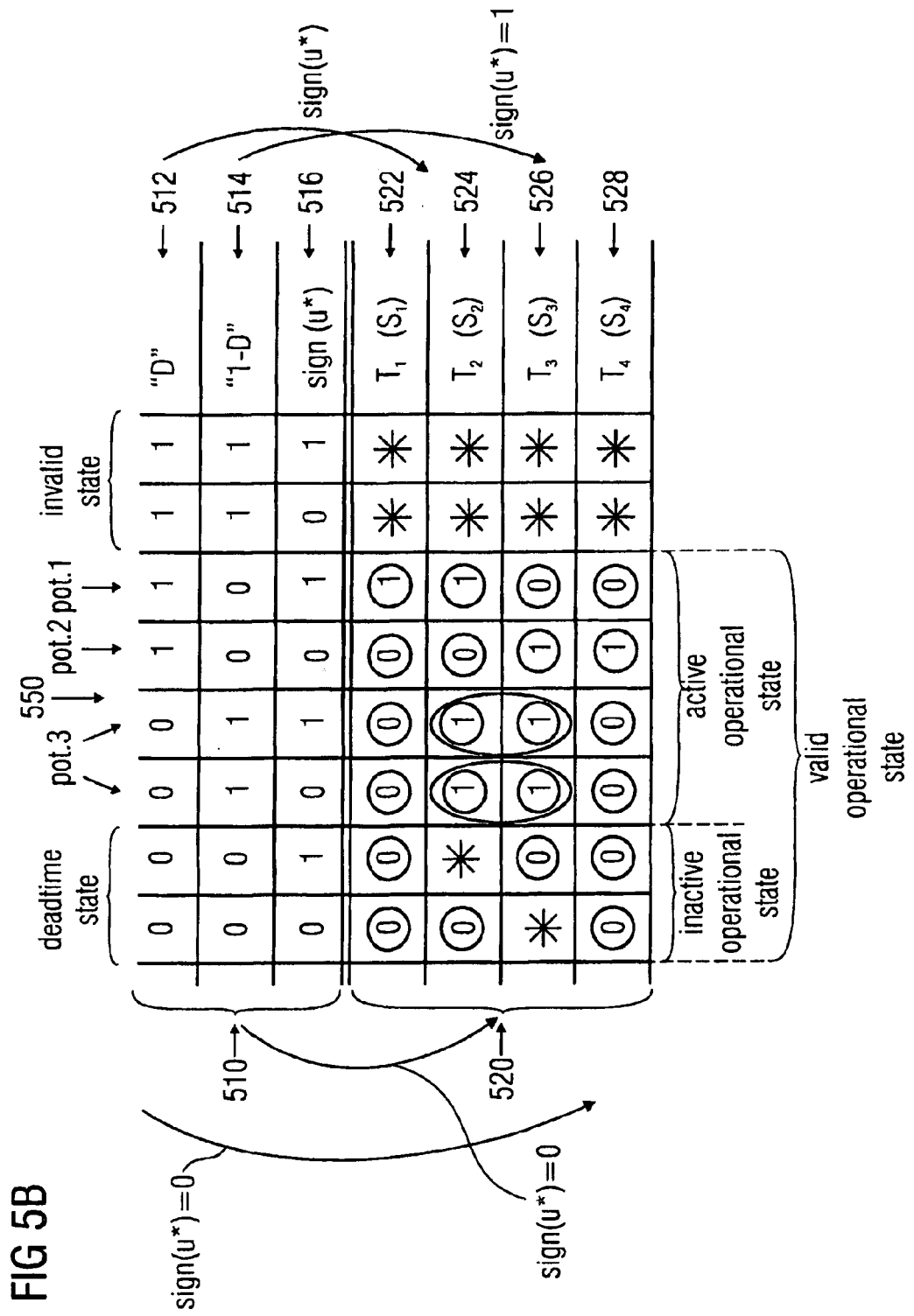
FIG. 5b is a generalized logic table of a signal converter, according to another embodiment of the invention.

FIG. 5b shows a generalized truth table, which is based on the truth table 500 of FIG. 5a. However, some generalizations are introduced, as will be discussed in the following. Nevertheless, identical elements of the truth tables are designated with identical reference numerals for the sake of simplicity.

However, in the output portion 520 of the truth table 550, some elements are designated with a "*", rather than with a "0" or "1". It should be noted that the states of the output signals designated with a "*" can be chosen freely in some embodiments. For example, the state of the second switch drive signal 144 can be chosen to be either active or inactive, if both the first PWM signal and the second PWM signal are inactive and the polarity signal is active. Similarly, the state of the third output signal 424 can be chosen to be either active or inactive if both the first PWM signal and the second PWM signal are inactive and the polarity signal is also inactive. Moreover, if it is ensured by the PWM signal generator 130 that the invalid state does not occur, arbitrary states can be associated to the output signals by the signal converter 140 in the invalid state (with both the first PWM signal and the second PWM signal active), as shown in FIG. 5b.

It should be noted here that FIG. 5b also shows different operation states. In a "dead time state" or "inactive operational state", both the first PWM signal 132 and the second PWM signal 134 are inactive. In a so called "active operational state" one and only one out of the first PWM signal 132 and the second PWM signal 134 is active. Both the "inactive operational state" and the "active operational state" are considered valid operational states.

It can be seen that in the valid operational states, the first switch drive signal 142 comprises the same state as the first PWM signal 132, if the polarity signal 136 is active. Also, if the polarity signal 136 is active, the third switch drive signal 146 takes over the state of the second PWM signal 134.

If the polarity signal 136 is inactive, the second switch drive signal 144 takes the state of the second PWM signal 134, and the fourth switch drive signal 148 takes the state of the first PWM signal 132 (at least for the valid operational states).

Figure 6A:
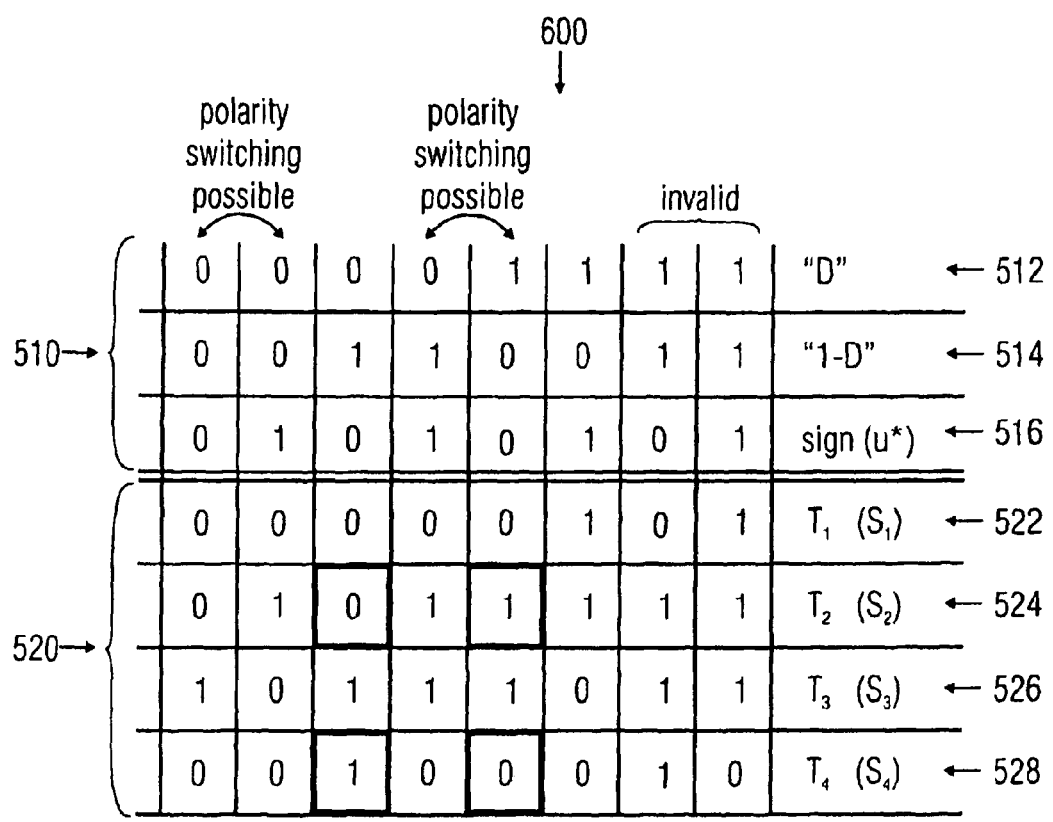
FIG. 6a is a logic table of a signal converter, according to another embodiment of the invention.

FIG. 6a shows a truth table of an alternative signal converter, according to an embodiment of the invention. The truth table shown in FIG. 6a is designated in its entirety with 600. For the sake of brevity, elements of the truth table 600, which are identical to elements of the truth tables 500, 550 are designated with identical reference numerals.

Figure 6B:
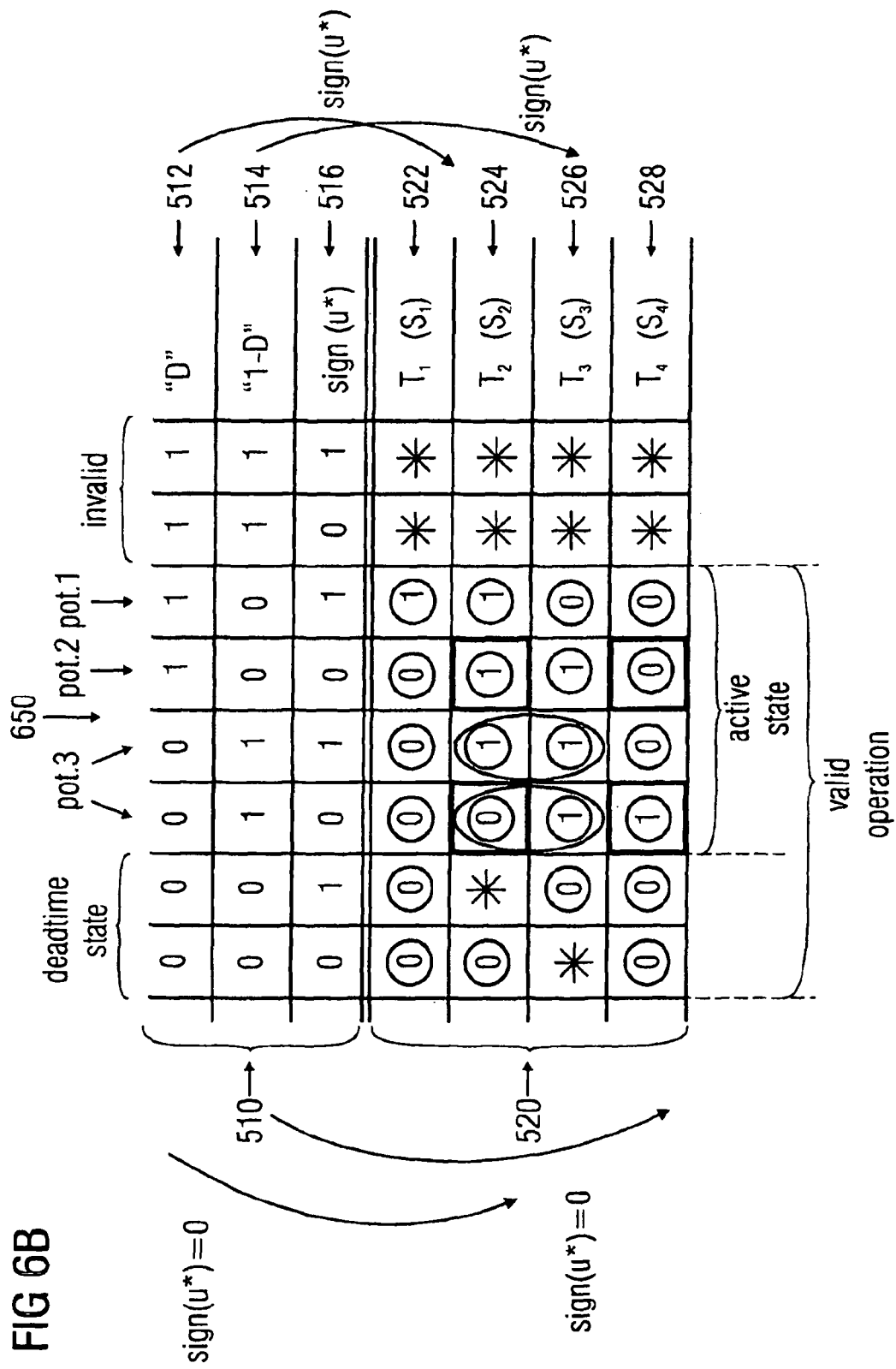
FIG. 6b is a generalized logic table of a signal converter, according to another embodiment of the invention.

FIG. 6b shows a generalized version of the truth table of FIG. 6a. The truth table of FIG. 6b is designated in its entirety with 650. Again, identical truth table elements are designated with identical reference numerals when compared to the truth table of FIG. 6.

To summarize the above, the signal converter 140 can implement different logical functionalities while still fulfilling the purpose to generate four appropriate output signals for driving switches on the basis of the first PWM signal 132 "D" and the second PWM signal 134 "1-D" and the polarity signal 136.

Nevertheless, it should be noted that in some embodiments it is necessitated to adapt a time, at which the polarity signal is switched, to the specific implementation of the signal converter in order to avoid the generation of a short circuit between different potentials in the switch circuit.

In the following, some examples will be given with respect to the switch circuit in order to improve the understanding of some embodiments of the invention. During the following explanations, the functionality of the level converter 150 will be neglected. Rather, it will simply be assumed that a switch is closed, if the corresponding switch drive signal is active, and that a switch will be open if the corresponding switch drive signal is inactive. Naturally, real switches may have delay times, for example a switch-on delay time and a switch-off delay time. To some extent, the dead time mentioned above is used in order to compensate for these delay times in order to avoid any undesirable short circuit situations.

Figure 7:
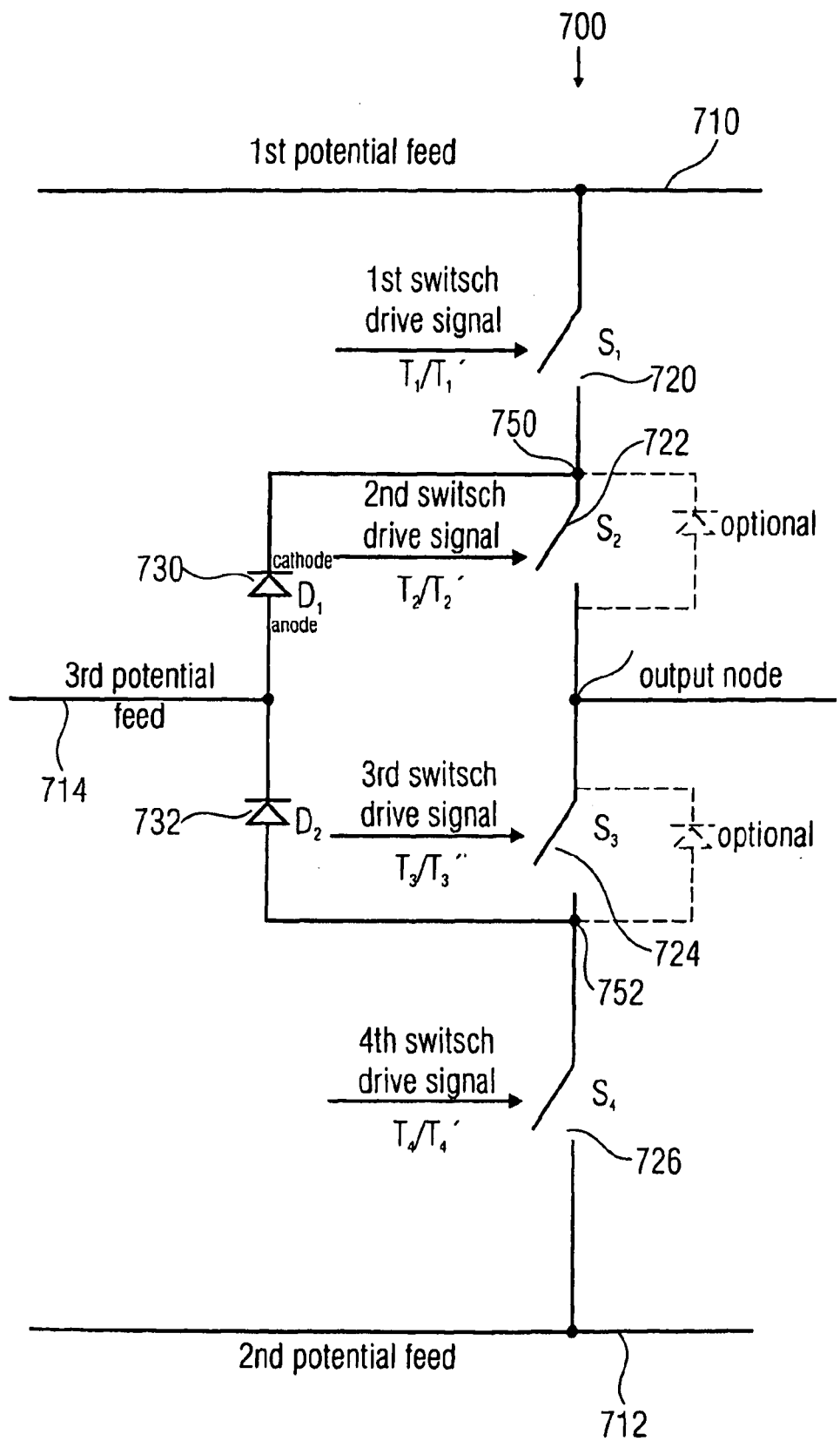
FIG. 7 is a block schematic diagram of a switch circuit, according to an embodiment of the invention.

Taking reference to FIG. 7, a switch circuit will be described. FIG. 7 shows a block schematic diagram of a switch circuit, according to an embodiment of the invention. The switch circuit of FIG. 7 is designated in its entirety with 700 and may for example take the place of the switch circuit 160 shown in FIG. 1. The switch circuit 700 comprises a first potential feed 710, a second potential feed 712 and a third potential feed 714. Further, the switch circuit 700 comprises a first switch 720, a second switch 722, a third switch 724 and a fourth switch 726. Also, the switch circuit 700 comprises two unidirectional conducting devices 730, 732, for example a first diode 730 and a second diode 732. Also, the switch circuit 700 comprises an output node 740, at which an output signal of the switch circuit 700 is present.

The first switch 720 and the second switch 722 are circuited in series between the first potential feed 710 and the output node 740. The third switch 724 and the fourth switch 726 are circuited in series between the output node 740 and the second potential feed 712. A node 750, via which the first switch 720 is coupled with the second switch 722, is coupled to the third potential feed 714 via the first unidirectional conducting device, for example via the first diode 730. A node 752, via which the third switch 724 is coupled with the fourth switch 726, is coupled to the third potential feed via the second unidirectional conducting device 732, for example via the second diode 732.

The first switch 720 is controllable via the first switch drive signal, for example via the first switch drive signal 142 or via the corresponding level-converted switch drive signal 152. The second switch 722 is controllable via the second switch drive signal 152, for example via the second switch drive signal 144 or via the level-converted second switch drive signal 154. The third switch 724 is controllable via the third switch drive signal, for example via the third switch drive signal 146 or via the level-converted third switch drive signal 156. The fourth switch 726 is controllable via the fourth switch drive signal, for example via the fourth switch drive signal 148 or via the fourth level-converted switch drive signal 158.

The switch drive signals for controlling the switches 720 to 726 can be generated in an embodiment by the signal converter 400, for example directly or making use of an additional level converter 150.

It should be noted that the switches 720, 722, 724, 726 can for example be implemented by semiconductor switch elements. In general, any controllable device can be used which is capable of switching on and switching off. In some embodiments, isolated gate bipolar transistors may be used as switches. However, in some other embodiments, bipolar transistors, field-effect transistors, thyristors or other semiconductor switch elements may be used as switches, possibly in combination with additional elements (for example for actively switching off). In some embodiments, high-voltage semiconductor devices (for example devices capable of tolerating voltages of 1000V and more) are used as switches. However, in some other embodiments medium voltage or low voltage devices are used.

Figure 8:
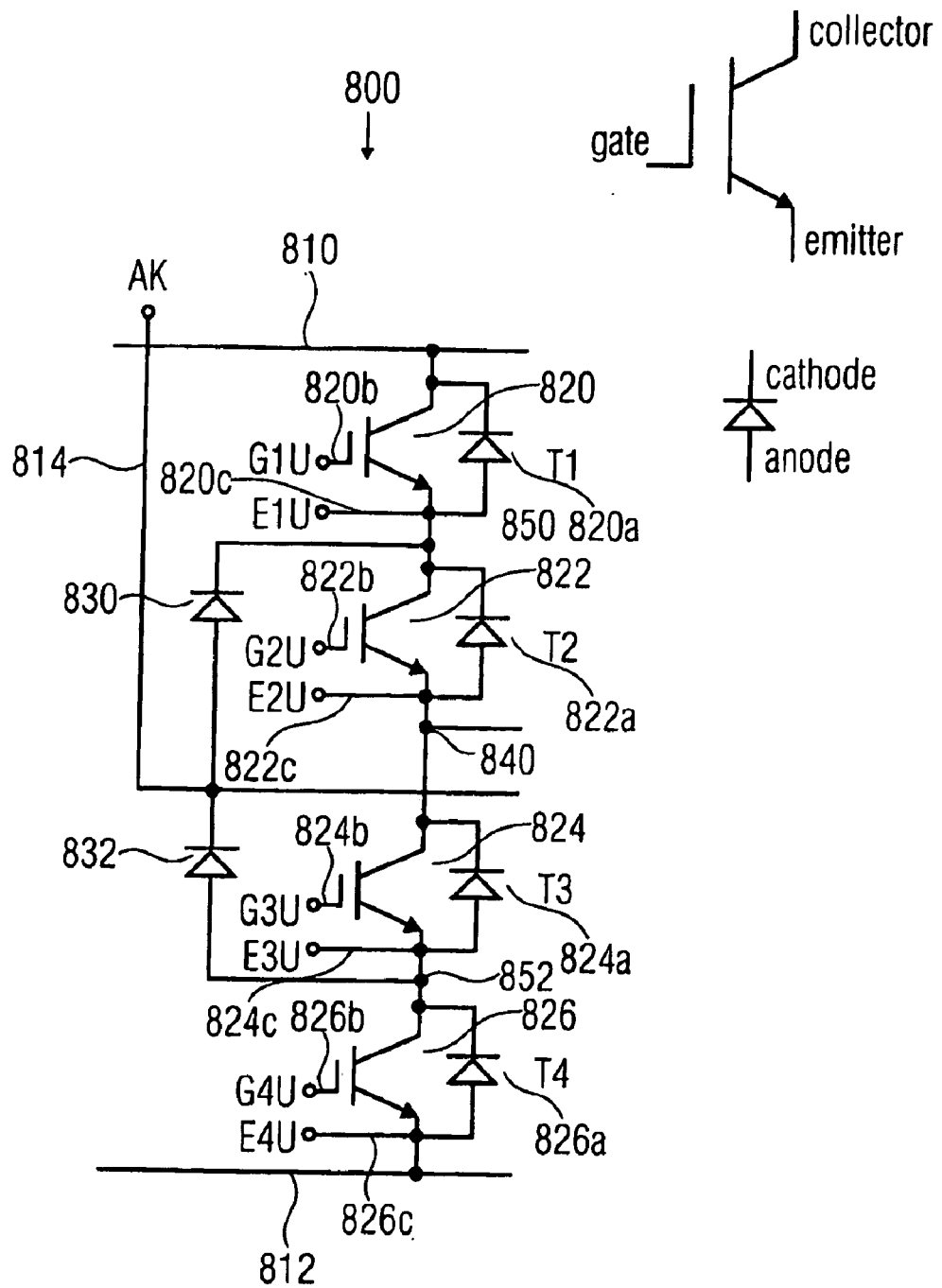
FIG. 8 is a schematic diagram of a switch circuit, according to another embodiment of the invention.

FIG. 8 shows a schematic diagram of a switch circuit, according to another embodiment of the invention. The switch circuit of FIG. 8 is designated in its entirety with 800. The switch circuit 800 comprises a first potential feed 810, a second potential feed 812 and a third potential feed 814. The switch circuit 800 comprises a first isolated gate bipolar transistor (IGBT) 820, which acts as a first switch. The switch circuit also comprises a second IGBT 822, which acts as second switch, a third IGBT 824, which acts as a third switch and a fourth IGBT 826, which acts as a fourth switch. Recovery diodes or reverse diodes 820a, 822a, 824a, 826a are circuited in parallel to the collector-emitter paths of the IGBTs 820, 822, 824, 826, as shown in FIG. 8. An output node is designated with 840. A node 850, via which the first IGBT is coupled to the second IGBT, is coupled to the third potential feed 814 via a diode 830. A node 852, via which the third IGBT 824 is coupled with the fourth IGBT 826, is coupled with the third potential feed 814 via the diode 832. With respect to the polarities of the elements and details of the circuit, reference is made to FIG. 8.

Potential differences between respective gate terminals 820b, 822b, 824b, 826b and emitter terminals 820c, 822c, 824c, 826c determine whether the switches 820, 822, 824, 826 are switched on or switched off. Said potential differences can for example be generated by the level converter 150 on the basis of the switch drive signals 142 to 148 provided by the signal converter 140, such that the state of the I-th switch is effectively controlled by the I-th switch drive signal (with 1<=I<=4).

Regarding the operation of the switch circuit 700, and also of the switch circuit 800, it should be noted in a normal mode of operation, three different potentials are applied to the potential feeds 710, 810, 712, 812, 714, 814. For example, the potential at the first potential feed 710, 810 is more positive than the potential at the third potential feed 714, 814. The potential at the third potential feed 714, 814 is normally more positive than the potential at the second potential feed 712, 812.

In operation, the potential at the output node 740, 840 is adjusted by coupling the output node 740, 840 with one of the potential feeds in a pulse-width-modulated way.

For example, if an output potential is to be generated at the output node 740, 840, an average value of which lies between the potential at the third potential feed and the potential at the first potential feed 710, the output node 740 is alternatingly coupled to the third potential feed 714 and to the first potential feed 710. In this case, the polarity signal mentioned above may for example be set to an active state indicating the first polarity (for example indicating that the output node 740 should be positive with respect to the potential at the third potential feed 714). In this case, the second switch 722, 822 may be closed, and the first switch 720, 820 and the third switch 724, 824 may be closed alternatingly. The relationship between the time duration during which the first switch 720, 820 is closed, and the time duration during which the third switch 724, 824 is closed, is for example determined by the pulse-width-modulation signals 132, 134 in this case. Also, a simultaneous or overlapping conductive state of the first switch 720 and the third switch 724 is avoided due to the dead time between the first PWM signal 132 and the second PWM signal 134, as described with reference to FIGS. 2a and 2b. In the embodiment described here, the fourth switch 726 is in an opened switch, if the potential to be generated at the output node 740, 840 is positive with respect to the potential at the third potential feed 714, 814.

If, in contrast, a potential is to be generated at the output node 740 which is negative with respect to the potential at the third potential feed, the first switch 720 is opened, and the third switch 724 is closed (for example, but not necessarily, permanently). The second switch 722, 822 and the fourth switch 726, 826 are closed alternatingly, wherein a ratio of a time duration during which the second switch 722 is closed, and a time duration during which the fourth switch 726 is closed, is determined by the pulse-width-modulation signals 132, 134. Again, the dead time between the PWM signals 132, 134 may help to ensure that a short circuit is avoided.

As can be easily understood by men skilled in the art, that it is undesirable that three or more of the switches shown in FIGS. 7 and 8 are closed simultaneously. Thus, in some embodiments care is taken that such a state is avoided.

Figure 9A:
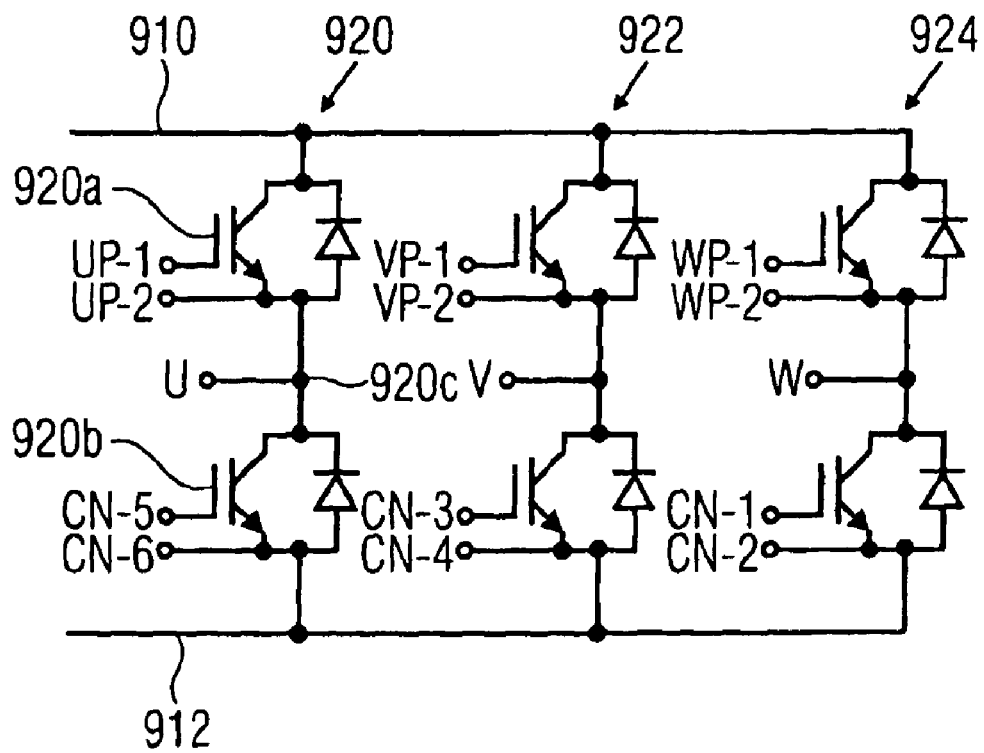
FIG. 9a is a schematic diagram of a 3-phase 2-level switch circuit, for use in a 2-level converter.

In the following, three phase topologies of the switch circuit will be shown. For comparison purposes, FIG. 9a shows a schematic diagram of a switch circuit comprising a 2-level topology. The switch circuit of FIG. 9 is designated in its entirety with 900. The switch circuit 900 comprises a first potential feed 910 and a second potential feed 912. Moreover, there is a first phase branch 920, a second phase branch 922 and a third phase branch 924. The first phase branch 920 comprises a first switch 920a and a second switch 920b for alternatingly coupling an output node 920c to the first potential feed 910 or to the second potential feed 912. It should be noted here that the first switch 920a and the second switch 920b can for example be driven directly on the basis of the first pulse-width-modulation signal 132 and the second pulse-width-modulation signal 134 (wherein, naturally, a level converter can be used). In other words, the first pulse-width-modulation signal 132 and the second pulse-width-modulation signal 134 can be used directly (without an intermediate signal converter) to drive a switch circuit having a 2-level topology. Nevertheless, it should be noted that the same signal can be used, making use of the signal converter 140, in order to derive therefrom with little effort switch drive signals for a 3-level topology.

Figure 9B:
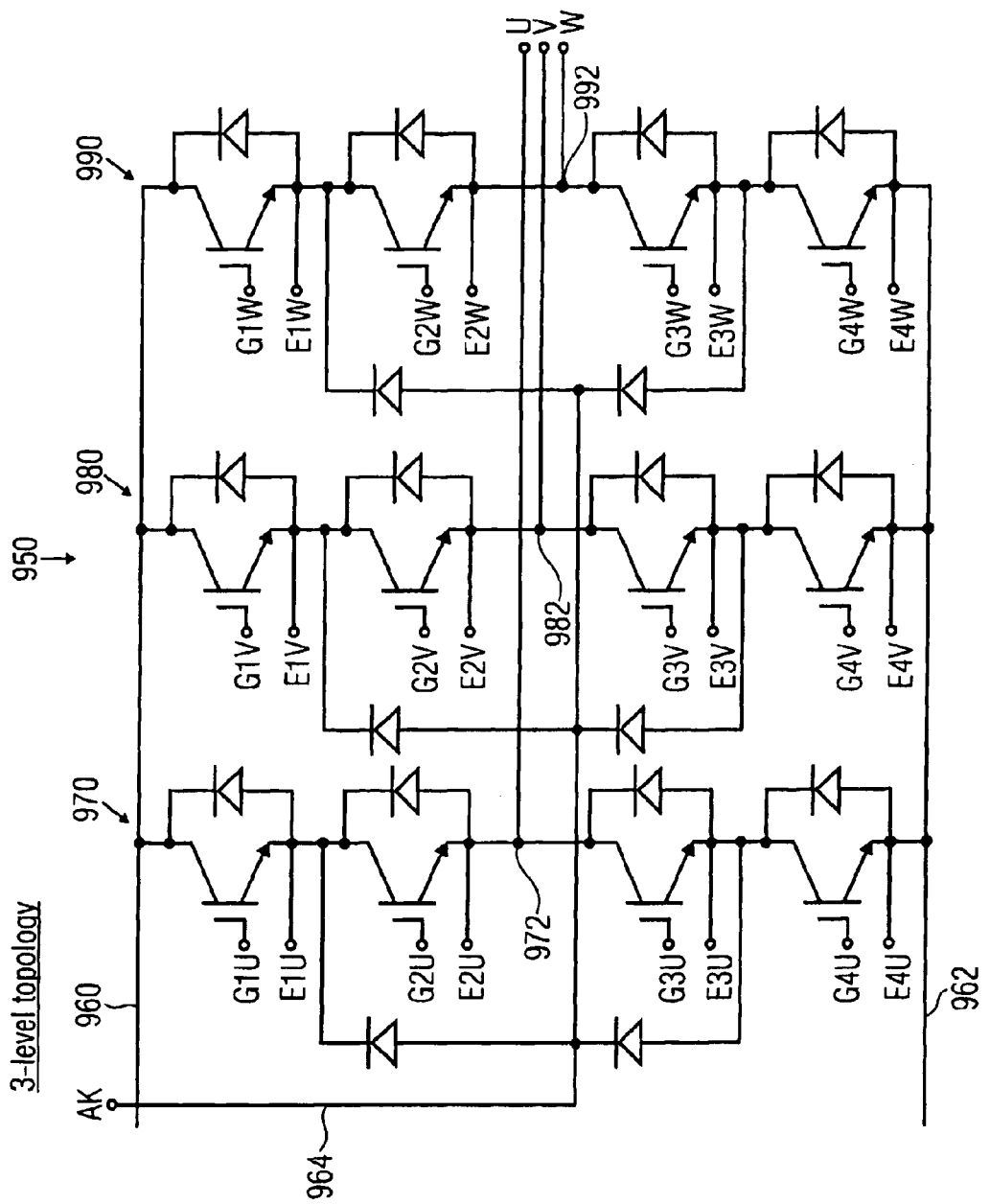
FIG. 9b is a schematic diagram of a 3-phase 3-level switch circuit, for use in a 3-level converter.

FIG. 9b shows a schematic diagram of a 3-phase switch circuit comprising a 3-level topology. The switch circuit of FIG. 9b is designated in its entirety with 950. The switch circuit 950 comprises a first potential feed 960, a second potential feed 962 and a third potential feed 964. Also, the switch circuit 950 comprises a first phase branch 970, a second phase branch 980 and a third phase branch 990, wherein the first phase branch 970 may for example be configured to provide, at an output node 972, a first phase output signal "U", which may for example be equivalent to the output signal 162. Similarly, the second phase branch 980 may be configured to provide, at an output node 982, a second phase output signal "V", and the third phase branch 990 to provide at an output node 992 a third phase output signal "W". It should be noted here that each of the three phase branches 970, 980, 990 may have a structure as described with reference to FIG. 8, as can be easily seen. The control signals for the switches of the different phase branches 970, 980, 990 may be generated independently, for example on the basis of command signals provided by a command signal generator 120, as shown in FIG. 1.

In the following, it will be described with reference to FIGS. 10a, 10b and 10c, how the signals provided by the PWM signal generator 130 can be used on the one hand for directly driving the switches of a 2-level switch circuit (as shown, for example, in FIG. 9b) and on the other hand, for driving, making use of the signal converter 140, the switches of a 3-level switch circuit.

FIG. 10a shows a table representing an association between PWM signals 132, 134 and control signals for the switches 920a, 920b. The table shown in FIG. 10a is designated in its entirety with 1000. The first column 1010 describes a polarity ("+" or "−") of the voltage to be generated at the output node 920c. The second column 1012 describes a current direction of an output current flowing out of the output node 920 (for example to a load device or load circuit) or into the current 920 (for example from the load device or load circuit). A third column 1014 describes, which of the two PWM signals 132, 134 can be used to determine the state (open/closed) of the first switch 920a, which is also designated as "T1". A column 1016 describes which of the PWM signals 132, 134 can be used to determine the state (open/closed) of the second switch 920b, also designated as "T2". As can be seen from the table 1000, the first PWM signal 132 ("D") can be used, independent from the polarity of the voltage shown in the column 1010, and independent from the current direction shown in the column 1012, to determine the state of the first switch 920a. As can be seen from the column 1016, the second PWM signal 134 ("1-D") can be used, independent on the polarity of the voltage to be generated at the output node 920c, and independent on the current direction, to determine the state of the second switch 920b.

However, things get somewhat more complicated for a 3-level topology. FIGS. 10b and 10c show tables indicating how the PWM signals 132, 134 can be associated with the switches in a 3-level topology in dependence on the polarity of the output signal to be generated at the output node of the switch circuit. If one of the PWM signals 132, 134 is associated with one of the switches, said PWM signal actually controls the state (open/close) of the switch to which it is associated. For example, a "D" in the tables of FIGS. 10b and 10c indicates that the first PWM signal 132 is associated with a respective switch (wherein different columns indicate the different switches). An entry of "1-D" in the tables of FIGS. 10b and 10c indicates that the second PWM signal 134 is associated with the respective switch.

The table of FIG. 10b is designated in its entirety with 1020. The table 1020 comprises a column 1030, describing a polarity ("+", "−") of the signals to be generated at the output node 740, 840 (for example with reference to the potential provided via the third potential feed 714, 814). The second column 1032 describes a polarity of an output current sunk from the output node 740 by a load circuit, or sourced into the output node 740 by the load circuit. A column 1034 describes, which of the PWM signals is associated with the first switch 720, 820, i.e. which of the PWM signals determines the state of the first switch (or whether the first switch is set to a predetermined state "1" or "0" independent on the PWM signals). A column 1036 describes which of the PWM signals is associated with the second switch 722, 822, a column 1038 describes which of the PWM signals is associated with the third switch 724, 824, and a column 1040 describes which of the PWM signals provided by the PWM signal generator 140 is associated with the fourth switch 726, 826. It should be noted here that an entry of "0" determines that the respective switch is open, independent from the PWM signals 132, 134, and that a value of "1" indicates that the respective switch is closed, independent from the PWM signals 132, 134.

It can be seen from the table 1020, that for a positive polarity of the signal to be generated at the output node, the first PWM signal 132 may be associated with the first switch, and the second PWM signal may be associated with the third switch. Also, the second switch may be set to a closed state and the fourth switch may be set to an opened state for a positive polarity (confer rows 1042, 1044).

For a negative polarity of the signal to be generated at the output node, the first PWM signal 132 may be associated with the fourth switch 726, 826, and the second PWM signal may be associated with the second switch 722, 822. Also, for said negative polarity of the signal to be generated at the output node, the third switch may be closed, and the first switch may be opened (confer rows 1046, 1048).

It should be noted here that some of the states may be considered to be optional. These states are shown in the table 1020 in brackets.

FIG. 10c shows another table describing an exemplary association between PWM signals and switches. The table of FIG. 10c is designated in its entirety with 1060. It should be noted here that the content of the table 1060 is similar to the content of the table 1020, but describes a slightly modified association. For the sake of clarity, identical reference numerals have been used here to designate identical rows and columns of the table 1060 when compared to the table 1020.

In the following, a short comparison between a conventional solution for driving a 3-level technology switch circuit and a concept for driving a 3-level switch circuit according to an embodiment of the invention will be described with reference to FIGS. 11 and 12.

Figure 11:
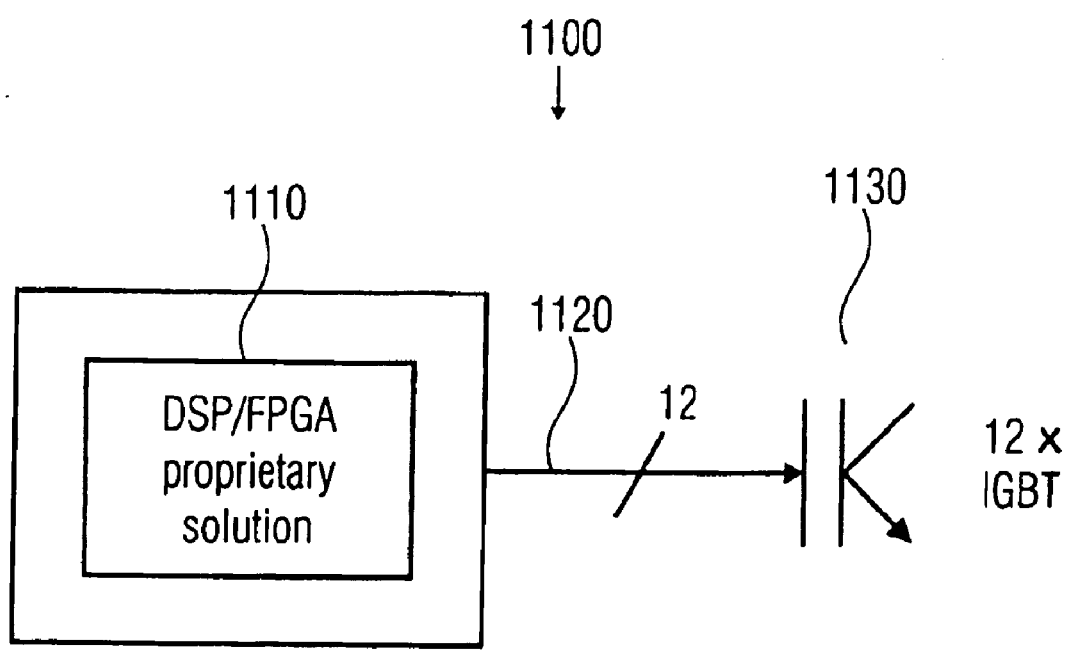
FIG. 11 is a strongly simplified block schematic diagram of a conventional 3-level converter.

FIG. 11 shows a block schematic diagram of a conventional system 1100 for driving switches of a 3-level technology switch circuit. The system comprises a digital signal processor (DSP) or a field programmable gate array (FPGA) 1110 for generating, for example twelve, switch drive signals 1120. The digital signal processor or field programmable gate array 1110 is configured in a proprietary way and therefore constitutes a proprietary solution. The switch drive signals 1120 are used to determine the state (on/off; open/closed) of the switches of the switch circuit, which may for example be implemented using twelve insulated gate bipolar transistors (IGBT) 1130. It should be noted that digital signal processors or field programmable gate arrays bring along substantial costs.

Figure 12:
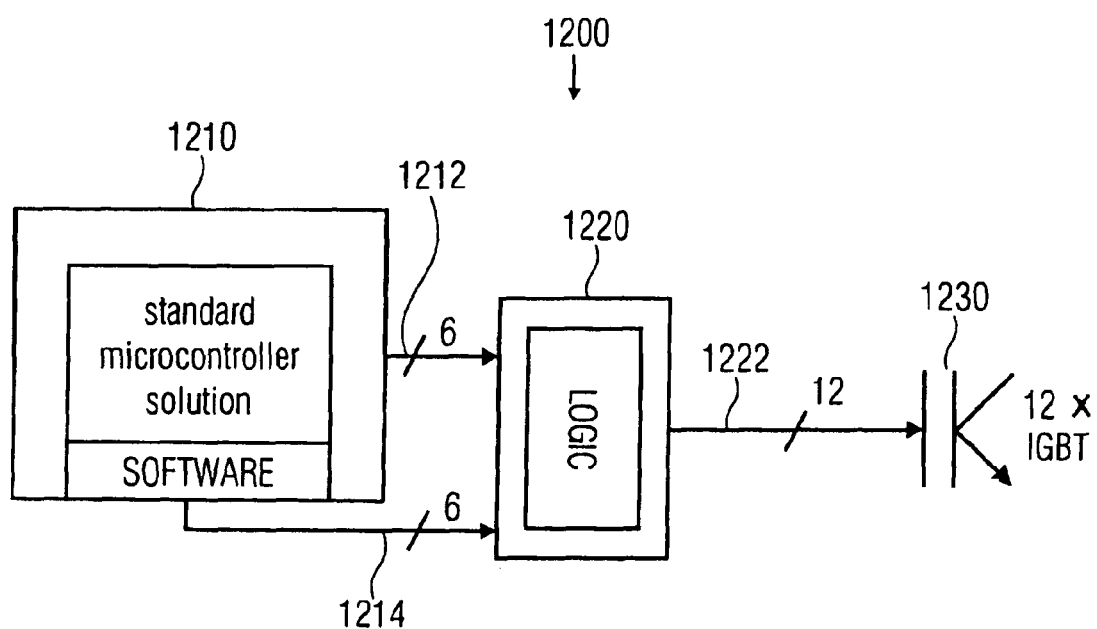
FIG. 12 is a simplified block schematic diagram of a 3-level signal converter, according to an embodiment of the invention.

FIG. 12 shows a block schematic diagram of a 3-phase multi-level converter, according to an embodiment of the invention. The multi-level converter is designated in its entirety with 1200. The multi-level converter comprises, for example, a standard microcontroller 1210. The standard microcontroller may for example comprise three pulse-width-modulation signal generators, as described with reference to FIGS. 2a, 2b and 2c. Thus, the microcontroller may for example provide three pairs of pulse-width-modulation signals 132, 134, 204, 206. The three pairs of pulse-width-modulation signals are shown in FIG. 12 as a first signal group 1212. Moreover, the microcontroller 1210 may be configured, for example by means of an appropriate software, to provide three polarity signals 1214, for example one or each of the groups of PWM signals. The multi-level converter 1200 further comprises a logic 1220, which is configured to receive the three pairs of PWM signals 1212 as well as the three polarity signals 1214. The logic 1220 may for example comprise three signal converters 140, 400 for fulfilling, for example, the functionality described with reference to FIGS. 3a and 3b, 4, 5a, 5b, 6a, 6b. Thus, for example a first of the signal converters receives the first pair of PWM signals and the corresponding first polarity signal to generate therefrom four switch drive signals, a second signal converter receives the second pair of PWM signals and the corresponding second polarity signal to generate therefrom four additional switch drive signals, and the third signal converter may receive the third pair of PWM signals and the third polarity signal to generate therefrom another four switch drive signals. Thus, the logic 1220, which may for example comprise a purely combinatorial, non-clocked logic, may be configured to generate twelve switch drive signals on the basis of the three pairs of PWM signals and the three polarity signals. The twelve switch drive signals 1222 may then be used to control the states of the switches 1230 in a switch circuit, for example in a switch circuit 950 as described with reference to FIG. 9b. Said switches may for example comprise insulated gate bipolar transistors 1230.

Figure 13:
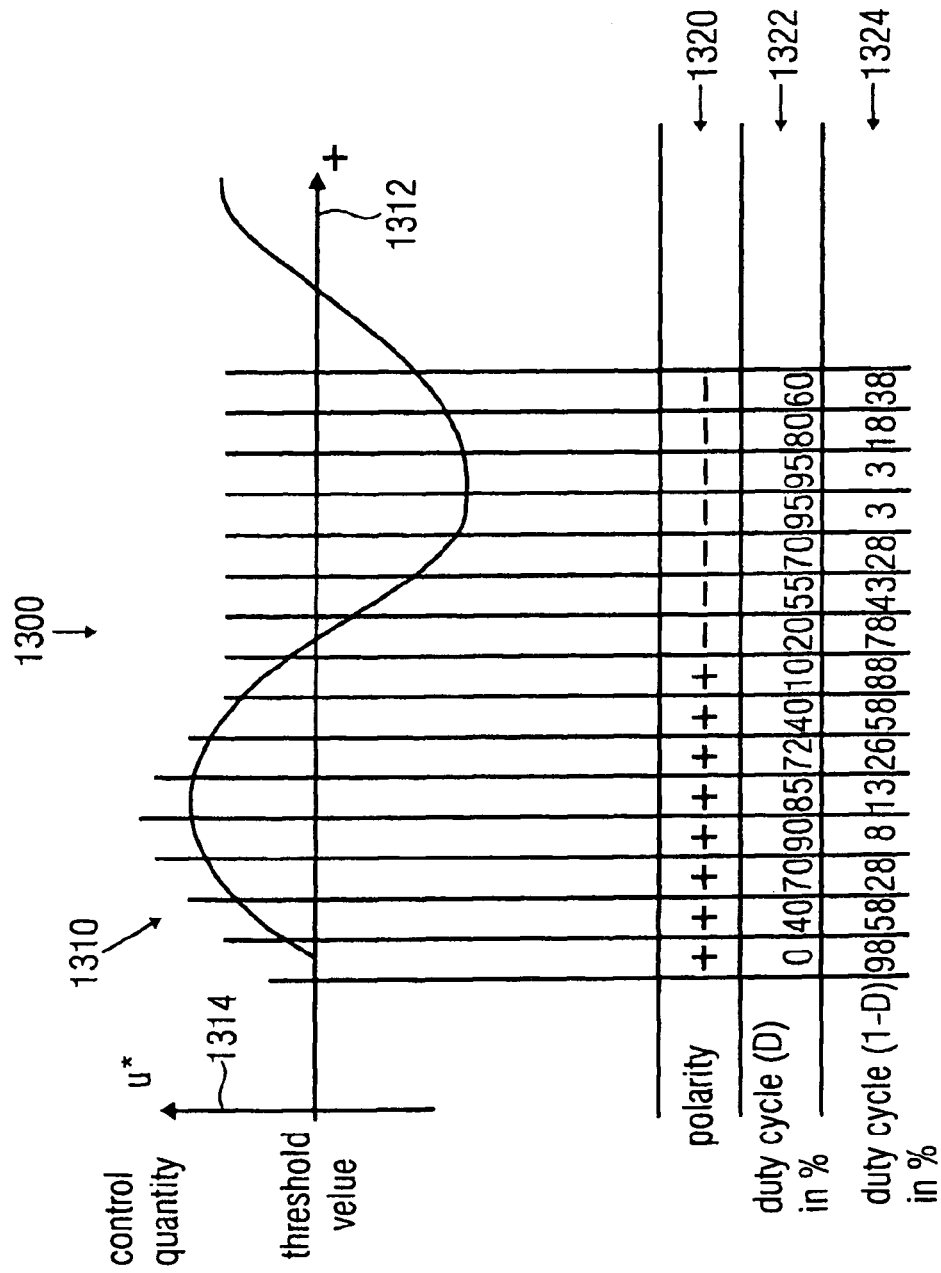
FIG. 13 is a graphical representation of the generation of a signal waveform using a concept according to an embodiment of the invention.

FIG. 13 shows a schematic representation of the generation of a signal waveform, according to an embodiment of the invention. The graphical representation of FIG. 13 is designated in its entirety with 1300. A first graphical representation 1310 describes a temporal evolution of the control quantity, for example of the value described by the command signal 122. An abscissa 1312 describes the time, and an ordinate 1314 describes the value of the control quantity. As shown in the graphical representation 1310, the control quantity may for example describe, by its temporal evolution, at least approximately a sinusoidal waveform (or any other waveform). Naturally, the control quantity may be quantized in time and/or in its magnitude. Also, it should be noted that for a certain period of time, the control quantity is larger than a threshold value, and that the control quantity is smaller than the threshold value for another period of time.

The polarity of the control quantity, with reference to the threshold value, is for example described in a row 1320 for discrete time intervals. A row 1322 describes a duty cycle of the first PWM signal 132 for the different discrete time intervals, and a row 1324 describes a duty cycle of the second PWM signal 134. As can be seen here, the duty cycles may change between the different time intervals, wherein the duty cycle of the first PWM signal 132 (shown in line 1322) describes, at least approximately, an absolute value of a difference between the control quantity and the threshold value. In contrast, the duty cycle of the second PWM signal 134, described in line 1322, is substantially inverse to the duty cycle of the first PWM signal 132. However, for a given discrete time interval, the sum of the duty cycles of the first PWM signal 132 and the first PWM signal 134 is somewhat smaller than 1 due to the dead times.

Moreover, it should be noted that the desired waveform, described by the control quantity, can be obtained from the pulse width modulated output signal 162, for example by low-pass filtering.

Figure 14:
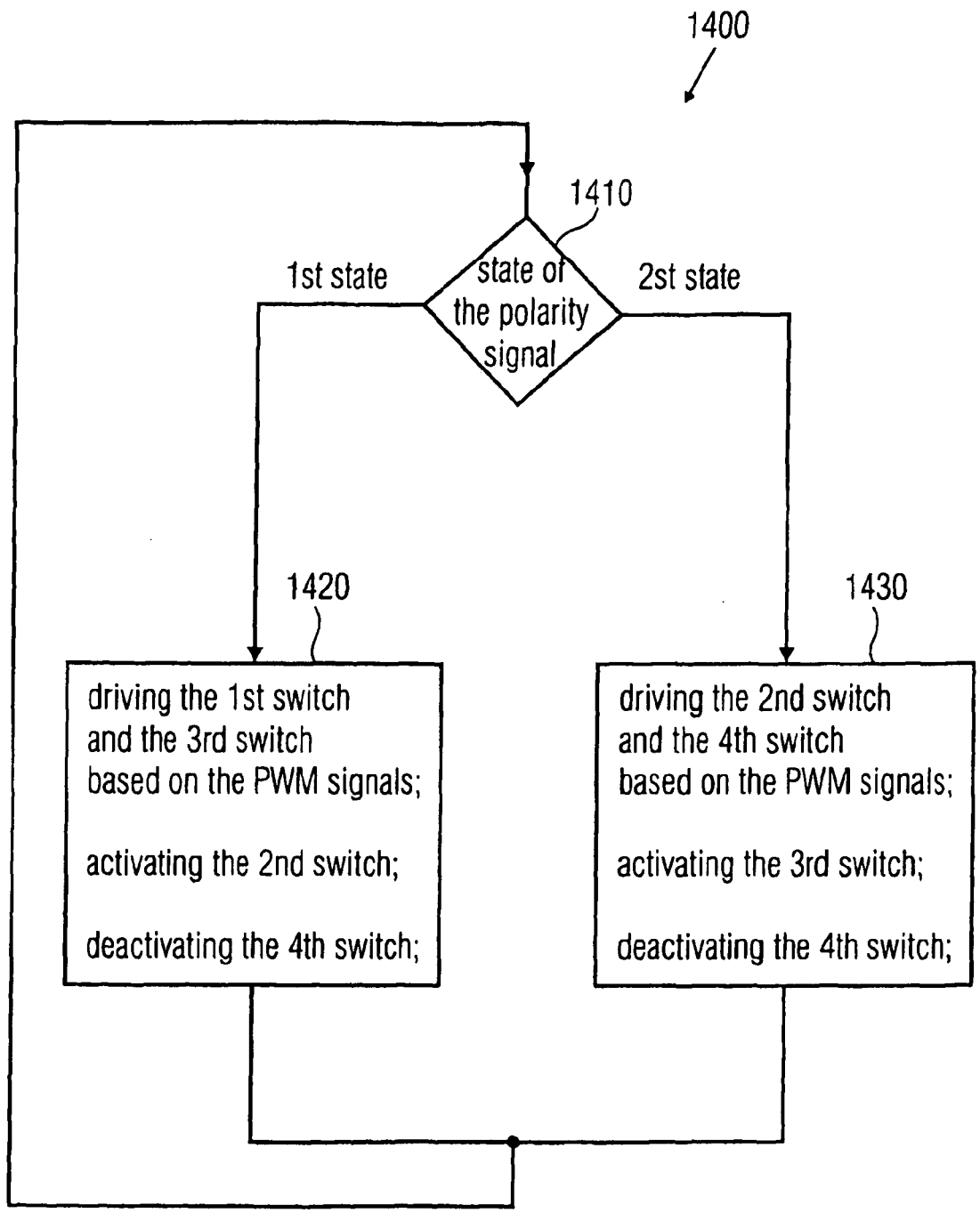
FIG. 14 is a flow chart of a method for driving at least four switches of a switch circuit of a multi-level converter, according to an embodiment of the invention.

FIG. 14 shows a flow chart of a method for driving at least four switches of a switch circuit of a multi-level converter on the basis of a first pulse-width-modulation signal, a second pulse-width-modulation signal and a polarity signal. The first pulse-width-modulation signal and the second pulse-width-modulation signal are complementary with respect to each other, except for a dead time during which both the first pulse-width-modulation signal and the second pulse-width-modulation signal are inactive. The method comprises two alternatives in dependence on the state of the polarity signal. In other words, in a step 1410, which may be executed explicitly, or which may be an integrated part of the method, the state of the polarity signal is checked or evaluated. If the polarity signal takes the first state, a step 1420 of a driving the first switch and the third switch based on the PWM signals, of activating the second switch and of deactivating the fourth switch is executed. If the polarity signal takes the second state, a step 1430 of driving the second switch and the fourth switch based on the PWM signals, of activating the third switch and of deactivating the fourth switch is executed. It should be noted here, that a strict temporal separation of said steps is not necessitated. Rather, the detection of the state of the polarity signal can for example be integrated in the steps 1420, 1430. Moreover, it should be noted that the method 1400 shown in FIG. 4 can be executed repeatedly or even continuously.

Figure 15:
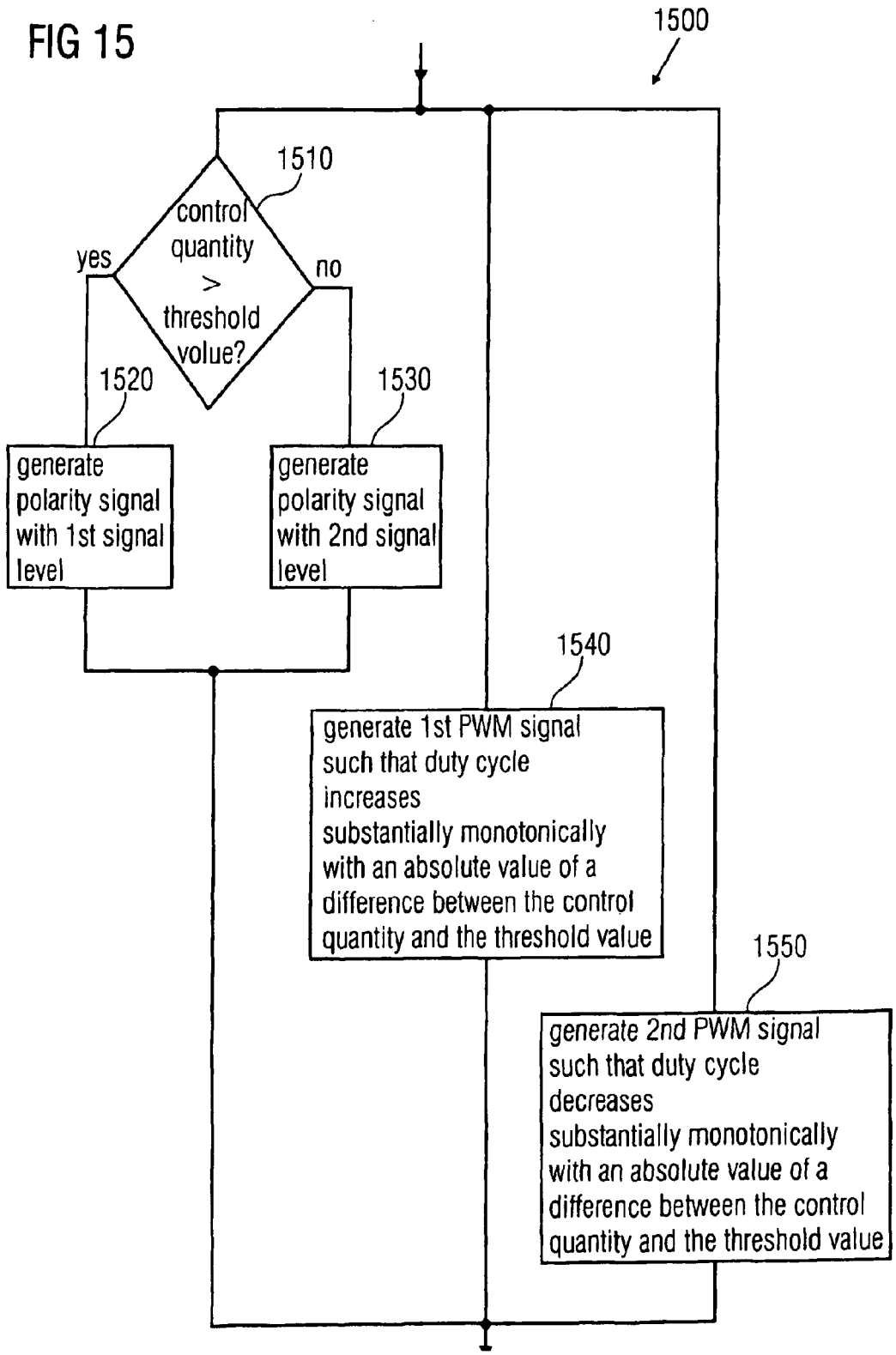
FIG. 15 is a flow chart of a method for generating two pulse-width-modulation signals and a polarity signal based on a control quantity, according to an embodiment of the invention.

FIG. 15 shows a flow chart of a method for generating two pulse-width-modulation signals and a polarity signal based on a control quantity, according to an embodiment of the invention. The method shown in FIG. 15 is designated in its entirety with 1500. The method 1500 comprises comparing 1510 whether the control quantity (for example a value of a command signal) is greater than the threshold value or smaller than the threshold value. If the control quantity is larger than the threshold value, the method 1500 comprises generating 1520 the polarity signal with a first signal level indicating a first polarity. If the control quantity is smaller than the threshold value, the method 1500 comprises generating 1530 the polarity signal with a second signal level indicating a second polarity (which may be different from the first polarity).

The method 1500 also comprises generating 1540 the first PWM signal such that a duty cycle of the first PWM signal increases substantially monotonically with an absolute value of a difference between the control quantity and the threshold value. The method 1500 comprises, for example, generating 1550 a second PWM signal such that a duty cycle of the second PWM signal decreases substantially monotonically with an absolute value of a difference between the control quantity and the threshold value.

It should be noted here, that the generation 1510, 1520, 1530 of the polarity signal, the generation 1540 of the first PWM signal and the generation 1550 of the second PWM signal may for example be executed in parallel. However, in some embodiments one or more steps of said signal generations can be performed alternatingly, if desired.

It should also be noted here, that the method 1400, 1500 described with reference to FIGS. 14 and 15 can be supplemented by any of the steps and functionalities described herein.

It should also be noted, that the methods 1400, 1500 described herein may for example be implemented in the form of a computer program.

Depending on certain implementation requirements of the inventive methods, the inventive methods can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate with a programmable computer system such that the inventive method is performed. Generally, the present invention is, therefore, a computer program product with a program code stored on a machine readable carrier, the program code being operative for performing the inventive method when the computer program product runs on a computer. In other words, the inventive method is, therefore, a computer program having a program code for performing the inventive method when the computer program runs on a computer.

Also, it should be noted that embodiments according to the invention may create different types of components. According to an embodiment, the invention creates a signal converter. According to another embodiment, the invention creates a drive circuit for generating switch drive signals, wherein the drive circuit may for example comprise the pulse-width-modulation signal generator 130 and the signal converter 140. Optionally, said drive circuit may also comprise the level converter. Some other embodiments according to the invention create a multi-level converter, wherein the multi-level converter may for example comprise the signal converter 140 and the switch circuit 160 and, optionally, the level converter 150. According to another embodiment, the multi-level converter may also comprise, optionally, the pulse-width-modulation signal generator. Other embodiments of the invention may be create the pulse-width-modulation signal generator 130, optionally in combination with the command signal generator. From the above, it can be seen that many different combinations of the components described in FIG. 1 could be sold. Accordingly, any such combination shall be considered an embodiment according to the invention. In other words, the invention is not restricted to a complete multi-level converter, but also comprises the sub-components defined by the claims.

In the following, some aspects according to the invention will be described. It should be pointed on that there are different topologies for implementing, for example, a power converter. For example, FIG. 9a shows a 2-level topology, and FIG. 9b shows a 3-level topology. In the following, the focus will lie on the realization of a 3-level converter driver.

FIG. 11 shows a conventional solution comprising a digital signal processor and/or a field programmable gate array. FIG. 12 shows a solution according to an embodiment of the invention. The table 1000 according to FIG. 10a shows an analysis of a pulse-width-modulation functionality in 2-level operation, for one phase. In other words, the table 1000 describes switching states for a phase of a 2-level converter in dependence on the polarity of the output voltage and the direction of the current.

The table 1020 according to FIG. 10b describes an analysis of the pulse-width-modulation functionality in a 3-level operation, for one phase. The table describes the switching states (as well as some optional switching states) for one phase of the 3-level converter in dependence on the polarity of the output voltage and the direction of the current.

In the following, a realization of an embodiment according to the invention will be described, wherein only one phase is shown here. It should be noted that embodiments according to the invention may either be used in a 1-phase system or in a multi-phase system (for example a 2-phase system, a 3-phase system or a system having more than three phases).

According to an embodiment, the switching states for a 3-level operation can be implemented with a software and/or hardware extension in a standard microcontroller comprising an integrated pulse width modulator for 2-level topologies. Details of such a realization can for example be seen in FIGS. 2b and 4.

Further, a phase of a 3-level converter (or a phase of the switch circuit thereof) is shown in FIG. 8.

The logic, which may for example be used in order to implement the functionality described with reference to FIG. 3a, 3b, 4, 5a, 5b, 6a, 6b, 10b or 10c may be part of a hardware (HW). A hybrid solution can for example be implemented in a simple CMOS (complementary metal oxide semiconductor) technology or a similar technology with standard components. For example, the logic described with reference to FIG. 4 may be implemented using components of CMOS technology, components of a NMOS technology, components of a transistor-transistor-logic or other components. For example, hardwired components can be used. Alternatively, programmable logic components like, for example, PALs, GALs, PLDs, CPLDs or FPGAs, can be used in order to implement the logic.

According to an aspect of the invention, the functionality of the pulse-width-modulation signal generator 290 can be implemented by a software/hardware solution, for example by a hybrid software/hardware solution. The signal converter, for example the signal converter 400 according to FIG. 4, can be implemented as a hardware-only component in some embodiments.

Some embodiments according to the invention can be used in the field of 3-level pulse-width-modulation. Some embodiments according to the invention can be used in the field of control for high power drive technology. 3-level pulse-width-modulation and control for high power drive technology can for example be applied for railway driving apparatuses and medium high voltage converters. The 3-level circuit technology is also increasingly relevant for interruptible power supplies, for example in a power range of about 7.5 kVA, i.e. for the mass market.

According to some aspects of the invention, a cheap hardware, for example a standard microcontroller, for 2-level topologies (which may comprise a pulse-width-modulation unit with dead time generation for six switching elements already integrated) can generate the drive signals of a 3-level drive using the software and logic described herein. According to some embodiments, this solution saves expensive signal processors and field programmable gate arrays. According to some embodiments, an estimated amount between 25 C = and 50 € per converter can be saved. However, according to some other embodiments the savings may be significantly smaller or larger.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A pulse width modulation signal generator for generating two pulse-width-modulation signals and a polarity signal on the basis of a control quantity, comprising:
  a polarity signal generator configured to generate the polarity signal with a first signal level indicating a first polarity, if the control quantity is larger than a predetermined threshold value, and to generate the polarity signal with a second signal level indicating a second polarity, if the control quantity is smaller than the predetermined threshold value; and
  a pulse width modulator configured to generate the first pulse-width-modulation signal such that a duty cycle of the first pulse-width-modulation signal increases substantially monotonically with an absolute value of a difference between the control quantity and the threshold value, and
  configured to generate the second pulse-width-modulation signal such that the second pulse-width-modulation signal is complementary with respect to the first pulse-width-modulation signal, except for a dead time, during which both the first pulse-width-modulation signal and the second pulse-width-modulation signal are inactive,
  wherein the pulse-width-modulation signal generator is configured to ensure, that the polarity signal remains unchanged as long as the first pulse-width-modulation signal is active.

2. The pulse-width-modulation signal generator according to claim 1, wherein the pulse-width-modulation signal generator is configured to activate the first pulse-width-modulation signal during a time interval with an adjustable time duration, which is substantially in the middle of a pulse-width-modulation time interval, and
  wherein the polarity signal generator is configured to change the polarity signal in response to an end of the pulse-width-modulation time interval, provided that a change is necessitated.

3. A driver circuit for generating switch drive signals for a multi-level converter, comprising:
  a pulse width modulation signal generator for generating two pulse-width-modulation signals and a polarity signal on the basis of a control quantity, comprising:
  a polarity signal generator configured to generate the polarity signal with a first signal level indicating a first polarity, if the control quantity is larger than a predetermined threshold value, and to generate the polarity signal with a second signal level indicating a second polarity, if the control quantity is smaller than the predetermined threshold value; and
  a pulse width modulator configured to generate the first pulse-width-modulation signal such that a duty cycle of the first pulse-width-modulation signal increases substantially monotonically with an absolute value of a difference between the control quantity and the threshold value, and configured to generate the second pulse-width-modulation signal such that the second pulse-width-modulation signal is complementary with respect to the first pulse-width-modulation signal, except for a dead time, during which both the first pulse-width-modulation signal and the second pulse-width-modulation signal are inactive, wherein the pulse-width-modulation signal generator is configured to ensure, that the polarity signal remains unchanged as long as the first pulse-width-modulation signal is active; and a signal converter configured to generate, on the basis of the first pulse-width-modulation signal, the second pulse-width-modulation signal and the polarity signal, at least four switch drive signals for driving at least four switches of the multi-level converter.

4. The driver circuit according to claim 3, wherein the signal converter comprises a logic configured to acquire the at least four switch drive signals by means of a combinatorial processing on the basis of the first pulse-width-modulation signal, the second pulse-width-modulation signal and the polarity signal.

5. The driver circuit according to claim 3, wherein the signal converter is configured to generate, in the presence of a first state of the polarity signal, the first switch drive signal and the third switch drive signal on the basis of the pulse-width-modulation signals, such that duty cycles of the first switch drive signal and the third switch drive signal are dependent on duty cycles of the pulse-width-modulation signals; and wherein the signal converter is configured to generate, in the presence of a second state of the polarity signal, the second switch drive signal and the fourth switch drive signal on the basis of the pulse-width-modulation signals, such that duty cycles of the second switch drive signal and the fourth switch drive signal are dependent on duty cycles of the pulse-width-modulation signals.

6. The driver circuit according to claim 3, wherein the signal converter is configured to set, in the presence of a first state of the polarity signal, the second switch drive signal and the fourth switch drive signal to predetermined signal values; and wherein the signal converter is configured to set, in the presence of a second state of the polarity signal, the first switch drive signal and the third switch drive signal to predetermined signal values.

7. The driver circuit according to claim 3, wherein the signal converter is configured to generate, in the presence of a first state of the polarity signal, a first switch drive signal and a third switch drive signal on the basis of the first pulse-width-modulation signal and the second pulse-width-modulation signal, such that the first switch drive signal and the third switch drive signal are complementary with respect to each other, except for a dead time during which both the first switch drive signal and the third switch drive signal are inactive;

wherein the signal converter is configured to set, in the presence of the first polarity of the polarity signal, a second switch drive signal to an active signal level and a fourth switch drive signal to an inactive signal level;

wherein the signal converter is configured to generate, in the presence of the second state of the polarity signal, the second switch drive signal and the fourth switch drive signal on the basis of the first pulse-width-modulation signal and the second pulse-width-modulation signal, such that the second switch drive signal and the fourth switch drive signal are complementary with respect to each other, except for a dead time, during which both the second switch drive signal and the fourth switch drive signal are inactive; and wherein the signal converter is configured to set, in the presence of the second state of the polarity signal, the first switch drive signal to an inactive signal level and the third switch drive level to an active signal level.

8. The driver circuit according to claim 7, wherein the signal converter is configured such that, in the presence of the first state of the polarity signal, the dead time, during which both the first switch drive signal and the third switch drive signal are inactive, is dependent on the dead time, during which the first pulse-width-modulation signal and the second pulse-width-modulation signal are inactive; and wherein the signal converter is configured such that, in the presence of the second state of the polarity signal, the dead time, during which both the second switch drive signal and the fourth switch drive signal are inactive, is dependent on the dead time, during which the first pulse-width-modulation signal and the second pulse-width-modulation signal are inactive.

9. The driver circuit according to claim 3, wherein the signal converter comprises a logic which is configured such that, in the presence of the first polarity and at least in an active operational state, the logic is operational to set the first switch drive signal according to one of the pulse-width-modulation input signals, to set the third switch drive signal according to another of the pulse width modulation input signals, to set the second switch drive signal to a given signal level indicating a closed state of the second switch and to set the fourth switch drive signal to a given signal level indicating an opened state of the fourth switch; and in the presence of the second polarity and at least in the active operational state, the logic is operational to set the second switch drive signal according to one of the pulse-width-modulation input signals, to set the fourth switch drive signal according to another of the pulse-width-modulation input signals, to set the first switch drive signal to a given signal level indicating an opened state of the first switch, and to set the third switch drive signal to a given signal level indicating a closed state of the third switch.

10. The driver circuit according to claim 9, wherein the logic is configured to implement, for different combinations of the first pulse width modulation input signal "D", the second pulse width modulation input signal "1-D" and the polarity signal "sign(u*)", a logic function according to the following truth table, in order to acquire the first switch drive signal "T1", the second switch drive signal "T2", the third switch drive signal "T3" and the fourth switch drive signal "T4":

| | | | | | | | | |
|---|---|---|---|---|---|---|---|---|
| 0 | 0 | 0 | 0 | 1 | 1 | 1 | 1 | "D" |
| 0 | 0 | 1 | 1 | 0 | 0 | 1 | 1 | "1-D" |
| 0 | 1 | 0 | 1 | 0 | 1 | 0 | 1 | sign(u*) |
| 0 | 0 | 0 | 0 | 0 | 1 | 0 | 1 | $T_1$ |
| 0 | 1 | 1 | 1 | 0 | 1 | 1 | 1 | $T_2$ |
| 1 | 0 | 1 | 1 | 1 | 0 | 1 | 1 | $T_3$ |
| 0 | 0 | 0 | 0 | 1 | 0 | 1 | 0 | $T_4$ | wherein a symbol "0" designates an inactive state of the respective signal, and wherein a symbol "1" designates an active state of the respective signal.

11. The driver circuit according to claim 9, wherein the logic circuit is configured to implement, for different combinations of the first pulse-width-modulation input signal "D", the second pulse-width-modulation input signal "1-D" and the polarity signal "sign(u*)", a logic function according to the following truth table, in order to acquire the first switch drive signal "T1", the second switch drive signal "T2", the third switch drive signal "T3" and the fourth switch drive signal "T4":

| | | | | | | | | |
|---|---|---|---|---|---|---|---|---|
| 0 | 0 | 0 | 0 | 1 | 1 | 1 | 1 | "D" |
| 0 | 0 | 1 | 1 | 0 | 0 | 1 | 1 | "1-D" |
| 0 | 1 | 0 | 1 | 0 | 1 | 0 | 1 | sign(u*) |
| 0 | 0 | 0 | 0 | 0 | 1 | 0 | 1 | $T_1$ |
| 0 | 1 | 0 | 1 | 1 | 1 | 1 | 1 | $T_2$ |
| 1 | 0 | 1 | 1 | 1 | 0 | 1 | 1 | $T_3$ |
| 0 | 0 | 1 | 0 | 0 | 0 | 1 | 0 | $T_4$ | wherein a symbol "0" designates an inactive state of the respective signal, and wherein a symbol "1" designates an active state of the respective signal.

12. The driver circuit according to claim 9, wherein the logic is configured to implement, for different combinations of the first pulse-width-modulation input signal "D", the second pulse-width-modulation input signal "1-D" and the polarity signal "sign(u*)", a logic function according to the following truth table, in order to acquire the first switch drive signal "T1", the second switch drive signal "T2", the third switch drive signal "T3" and the fourth switch drive signal "T4":

| | | | | | | | | |
|---|---|---|---|---|---|---|---|---|
| 0 | 0 | 0 | 0 | 1 | 1 | 1 | 1 | "D" |
| 0 | 0 | 1 | 1 | 0 | 0 | 1 | 1 | "1-D" |
| 0 | 1 | 0 | 1 | 0 | 1 | 0 | 1 | sign(u*) |
| 0 | 0 | 0 | 0 | 0 | 1 | * | * | $T_1$ |
| 0 | * | 1 | 1 | 0 | 1 | * | * | $T_2$ |
| * | 0 | 1 | 1 | 1 | 0 | * | * | $T_3$ |
| 0 | 0 | 0 | 0 | 1 | 0 | * | * | $T_4$ | wherein a symbol "0" designates an inactive state of the respective signal, wherein a symbol "1" designates an active state of the respective signal, and wherein a symbol "*" designates an arbitrary state of the respective signal.

13. The driver circuit according to claim 9, wherein the logic is configured to implement, for different combinations of the first pulse-width-modulation input signal "D", the second pulse-width-modulation input signal "1-D" and the polarity signal "sign(u*)", a logic function according to the following truth table, in order to acquire the first switch drive signal "T1", the second switch drive signal "T2", the third switch drive signal "T3" and the fourth switch drive signal "T4":

TABLE 4

| | | | | | | | | |
|---|---|---|---|---|---|---|---|---|
| 0 | 0 | 0 | 0 | 1 | 1 | 1 | 1 | "D" |
| 0 | 0 | 1 | 1 | 0 | 0 | 1 | 1 | "1-D" |
| 0 | 1 | 0 | 1 | 0 | 1 | 0 | 1 | sign(u*) |

TABLE 4-continued

| | | | | | | | | |
|---|---|---|---|---|---|---|---|---|
| 0 | 0 | 0 | 0 | 0 | 1 | * | * | $T_1 (S_1)$ |
| 0 | * | 0 | 1 | 1 | 1 | * | * | $T_2 (S_2)$ |
| * | 0 | 1 | 1 | 1 | 0 | * | * | $T_3 (S_3)$ |
| 0 | 0 | 1 | 0 | 0 | 0 | * | * | $T_4 (S_4)$ | wherein a symbol "0" designates an inactive state of the respective signal, wherein a symbol "1" designates an active state of the respective signal, and wherein a symbol "*" designates an arbitrary state of the respective signal.

14. A multi-level converter for generating an output signal on the basis of at least three different input potentials, comprising:
a driver circuit for generating switch drive signals for a multi-level converter, comprising:
a pulse width modulation signal generator for generating two pulse-width-modulation signals and a polarity signal on the basis of a control quantity, comprising:
a polarity signal generator configured to generate the polarity signal with a first signal level indicating a first polarity, if the control quantity is larger than a predetermined threshold value, and to generate the polarity signal with a second signal level indicating a second polarity, if the control quantity is smaller than the predetermined threshold value; and
a pulse width modulator configured to generate the first pulse-width-modulation signal such that a duty cycle of the first pulse-width-modulation signal increases substantially monotonically with an absolute value of a difference between the control quantity and the threshold value, and
configured to generate the second pulse-width-modulation signal such that the second pulse-width-modulation signal is complementary with respect to the first pulse-width-modulation signal, except for a dead time, during which both the first pulse-width-modulation signal and the second pulse-width-modulation signal are inactive,
wherein the pulse-width-modulation signal generator is configured to ensure, that the polarity signal remains unchanged as long as the first pulse-width-modulation signal is active; and
a signal converter configured to generate, on the basis of the first pulse-width-modulation signal, the second pulse-width-modulation signal and the polarity signal, at least four switch drive signals for driving at least four switches of the multi-level converter; and
a switch circuit comprising three potential feeds and at least four switches;
wherein a first switch and a second switch are circuited in series between a first potential feed and an output node, at which the output signal is present,
wherein a third switch and a fourth switch are circuited in series between the output node and a second potential feed,
wherein a node, via which the first switch is coupled with the second switch, is coupled with a third potential feed via a first unidirectional conducting device, and
wherein a node, via which the third switch is coupled with the fourth switch, is coupled with the third potential feed via a second unidirectional conducting device.

* * * * *